United States Patent
Takla et al.

(10) Patent No.: US 12,106,560 B2
(45) Date of Patent: Oct. 1, 2024

(54) PEST INFESTATION DETECTION FOR HORTICULTURAL GROW OPERATIONS

(71) Applicant: iUNU, Inc., Seattle, WA (US)

(72) Inventors: Ethan Victor Takla, Seattle, WA (US); Adam Phillip Takla Greenberg, Seattle, WA (US)

(73) Assignee: iUNU, INC., Seattle, WA (US)

( * ) Notice: Subject to any disclaimer, the term of this patent is extended or adjusted under 35 U.S.C. 154(b) by 475 days.

(21) Appl. No.: 17/162,673

(22) Filed: Jan. 29, 2021

(65) Prior Publication Data

US 2022/0245381 A1 Aug. 4, 2022

(51) Int. Cl.
| | |
|---|---|
| *G06K 9/00* | (2022.01) |
| *G06N 20/00* | (2019.01) |
| *G06T 7/70* | (2017.01) |
| *G06V 20/10* | (2022.01) |
| *G06V 40/10* | (2022.01) |

(52) U.S. Cl.
CPC ........... *G06V 20/188* (2022.01); *G06N 20/00* (2019.01); *G06T 7/70* (2017.01); *G06V 40/10* (2022.01); *G06T 2207/20076* (2013.01); *G06T 2207/30242* (2013.01)

(58) Field of Classification Search
CPC ..... A01N 61/00; A01M 31/002; A01M 1/026; G06T 2207/30188; G06T 2207/30242; G06Q 50/02; A01B 79/005; G06V 20/188
See application file for complete search history.

(56) References Cited

U.S. PATENT DOCUMENTS

| | | | | |
|---|---|---|---|---|
| 11,631,475 | B2* | 4/2023 | Fuxman | G06Q 10/04 |
| | | | | 702/19 |
| 2014/0279600 | A1* | 9/2014 | Chait | G06Q 10/0631 |
| | | | | 705/317 |
| 2016/0078375 | A1 | 3/2016 | Ethington et al. | |
| 2017/0273290 | A1* | 9/2017 | Jay | A01M 1/026 |
| 2017/0287160 | A1* | 10/2017 | Freudenberg | G06T 7/70 |
| 2019/0034736 | A1* | 1/2019 | Bisberg | G06V 20/66 |
| 2019/0223431 | A1* | 7/2019 | Rustia | A01M 1/026 |
| 2020/0253127 | A1 | 8/2020 | McCall et al. | |
| 2021/0027056 | A1* | 1/2021 | Koch | G06F 18/214 |

(Continued)

FOREIGN PATENT DOCUMENTS

WO 2021015468 A2 1/2021

OTHER PUBLICATIONS

PCT Patent Application No. PCT/US2022/012450, International Search Report mailed May 16, 2022, 4 pages.

(Continued)

*Primary Examiner* — Atiba O Fitzpatrick

(57) ABSTRACT

Disclosed are techniques for detecting and mitigating pest infestations within a grow operation. In some embodiments, such techniques comprise receiving, from a visual observer device, image data associated with a location within a grow operation. The image data is then used to determine at least one pest classification and a count associated with the pest classification. Distribution data is generated based on the at least one pest classification, count, and location. A level of risk can then be determined based on the distribution data. In some embodiments, if the level of risk is greater than a threshold level of risk, a recommendation may be generated based at least in part on the distribution data.

18 Claims, 11 Drawing Sheets

(56) References Cited

U.S. PATENT DOCUMENTS

| | | | |
|---|---|---|---|
| 2021/0279923 A1* | 9/2021 | Singh | G06T 11/001 |
| 2021/0375390 A1* | 12/2021 | Fuxman | A01N 61/00 |
| 2022/0155054 A1* | 5/2022 | Humpston | A01B 79/005 |
| 2024/0016137 A1* | 1/2024 | Siepe | C12Q 1/6895 |

OTHER PUBLICATIONS

PCT Patent Application No. PCT/US2022/012450, Written Opinion mailed May 16, 2022, 5 pages.

* cited by examiner

PEST INFESTATION DETECTION FOR HORTICULTURAL GROW OPERATIONS

BACKGROUND

Modern industrial horticultural operations include not merely the planting, cultivation, and harvesting of plants, but performing those operations with multiple plants, conditions, greenhouses, grow operations, and people, all in different geographic locations. Accordingly, collecting and marshaling of this information towards a coherent and effective horticultural operation is difficult. Generally, a master grower regularly collects information about a horticultural operation, identifies problems, identifies solutions for those problems and applies them for remediation. However, the master grower may not have enough information to properly identify a problem or may not be aware of the effectiveness of available solutions to the problem.

SUMMARY

Techniques are provided herein for detecting pest infestations within a grow operation. Some embodiments are further directed toward identifying a risk (e.g., of crop failure) associated with such an infestation based on a pest classification and plant type. In some embodiments, images are collected at various locations throughout a grow operation. A classifier is then used to classify one or more pests depicted within the images. Pest classification and count data are associated with locations throughout the grow operation. In some embodiments, distribution data may be generated that depicts a likely distribution of a pest population throughout the grow operation. A pest infestation may be detected based on that distribution data. A risk associated with the pest infestation may be calculated based on a destructiveness profile for the pest with respect to a particular plant type.

In some embodiments, a third-party (e.g., an insurance agency) may be provided with information about the determined risk. In some embodiments, a solution to the pest infestation may be provided. To do this, a set of potential solutions may be generated and then filtered based on grow operation preferences and/or requirements. For the purposes of this disclosure, the term "pest" may include any biological agent, whether destructive or beneficial in nature.

One embodiment is directed to a computer-implemented method performed by a service platform in communication with a grow operation. Such a method comprises receiving, from a visual observer device, image data, the image data being associated with a location within a grow operation, determining, from the image data, at least one pest classification and a count associated with the pest classification, generating a distribution data based on the at least one pest classification, count, and location, determining a level of risk associated with the distribution data, and upon determining that the level of risk is greater than a threshold level of risk, generating a recommendation based at least in part on the distribution data.

Another embodiment is directed to a computing device comprising a processor and a memory including instructions that, when executed with the processor, cause the computing device to, at least receive, from a visual observer device, image data, the image data being associated with a location within a grow operation, determine, from the image data, at least one pest classification and a count associated with the pest classification, generate a distribution data based on the at least one pest classification, count, and location, determine a level of risk associated with the distribution data, and upon determining that the level of risk is greater than a threshold level of risk, generate a recommendation based at least in part on the distribution data.

Another embodiment is directed to a non-transitory computer-readable media collectively storing computer-executable instructions that upon execution cause one or more computing devices to collectively perform acts comprising: receiving, from a visual observer device, image data, the image data being associated with a location within a grow operation, determining, from the image data, at least one pest classification and a count associated with the pest classification, generating a distribution data based on the at least one pest classification, count, and location, determining a level of risk associated with the distribution data, and upon determining that the level of risk is greater than a threshold level of risk, generating a recommendation based at least in part on the distribution data.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
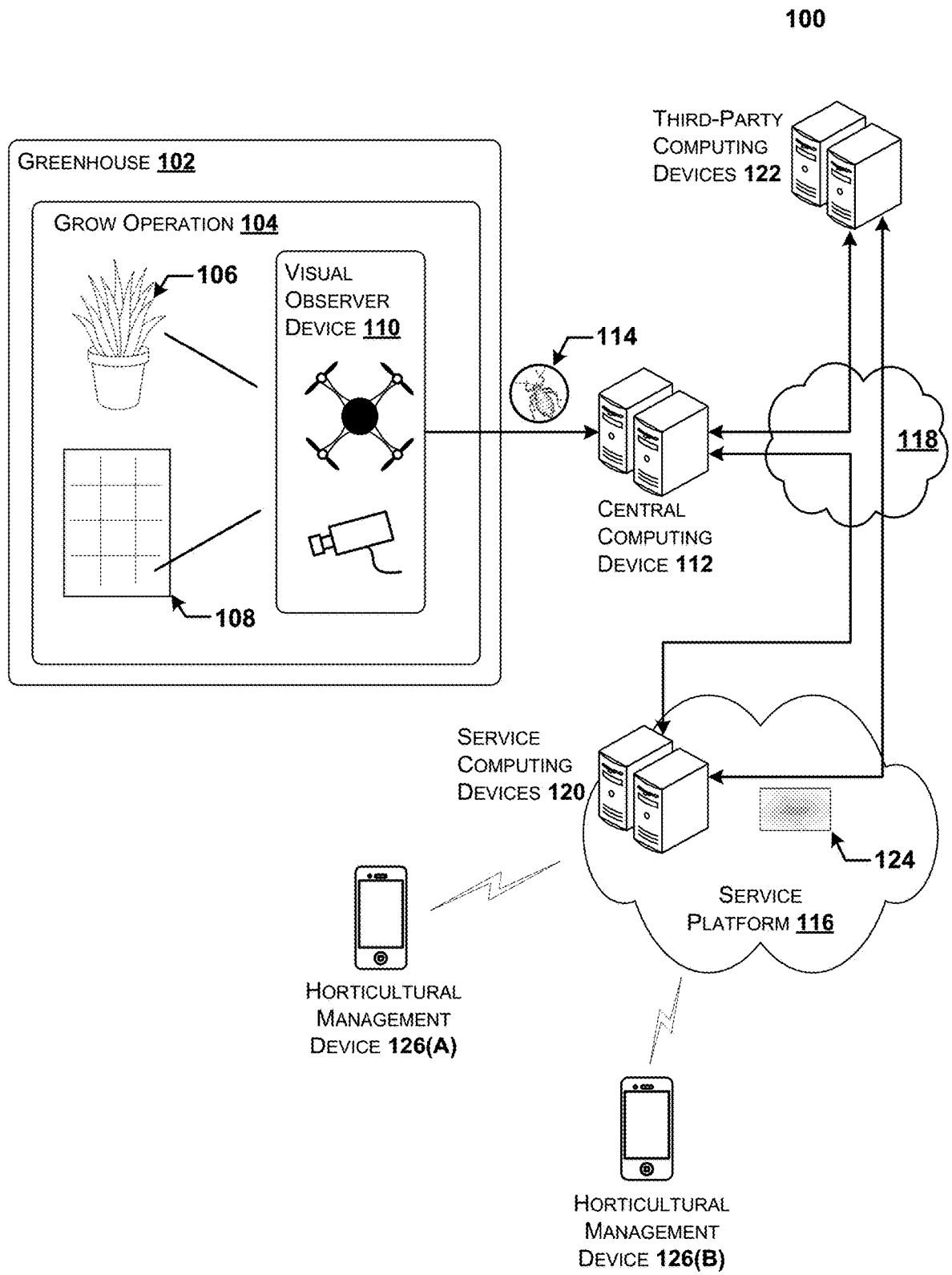
FIG. 1 depicts an exemplary context diagram 100 illustrating a pest distribution determination system for implementation in horticultural grow operations in accordance with embodiments.

Described herein are techniques for detecting and providing a solution for pest infestations within a grow operation.

Images are received from one or more visual observer devices. Each such received image is associated with a location in a grow operation at which the image was obtained. In some embodiments, one or more object recognition techniques (e.g., a classifier) are used to identify harmful biological agents (e.g., pests) within the images. Instances of pest classifications are then used to generate count information that is associated with each of the respective locations from which the image was obtained. Once count data has been generated for each pest classification for each of a number of locations throughout the grow operation, distribution data can be generated for the respective pest classification. In some embodiments, this may involve interpolating count data throughout an area based on the determined count data and using one or more suitable interpolation techniques. In some embodiments, such interpolation makes use of known relationships between various points located throughout the grow operation. For example, each point within the grow operation for which count data is determined may be treated as a vertex of a graph and the distribution data may be generated using a Graph Neural Network (GNN).

Once distribution data has been generated, a pest infestation may be detected using that distribution data. In some embodiments, this involves detecting variances between count data at particular points of the distribution data and an expected count. In some embodiments, a potential infestation is detected based on a rate of change between the generated distribution data and a previously generated distribution data. Additionally, a risk may be calculated based on the distribution. For example, a risk of crop failure may be determined based on a predicted rate of change in the pest population and/or a destructiveness profile for the pest with respect to a type of plant impacted.

A destructiveness profile may be a representation of a risk of harm that a particular pest classification is likely to cause to a particular plant type or group of plants. For example, a destructiveness profile may include a number of risk factors related to the pest classification. For example, in some embodiments a destructiveness profile may include an indication of an average volume of the plant that can/is consumed per population of pest classification. In another example, the destructiveness profile may include an indication of inter-plant "contagiousness" or other metric that represents a rate at which the pest can/will spread to other plants. Such an indication may be measured in terms of the number of plants the pest classification may spread to given a specific time period, set of environmental conditions, and/or average plant spacing/density. In another example, the destructiveness profile may include an indication of intra-plant "contagiousness" that represents an absolute or relative volume of plant matter that a pest classification may spread to within a single plant given a time period and/or set of environmental factors. In another example, the destructiveness profile may include an indication of a growth rate impact for the pest classification. Such an indication may be measured in terms of the potential for, and extent of, a reduction in a plant's growth rate per unit of population of the pest classification given a set of environmental conditions. In another example, the destructiveness profile may include an indication of a nutrient uptake impact. Such an indication may be measured in terms of a reduction in a plant's ability to uptake certain nutrients as a result of a pest classification presence given a set of environmental factors. In another example, the destructiveness profile may include an indication of a pest classification's impact on a susceptibility to other pests or diseases. In another example, the destructiveness profile may include an indication of food safety considerations, which may represent a measurement of a degree of risk that is induced by a pest classification with respect to a set of food safety guidelines. For example, the presence of a pest classification may violate a specific food safety guideline, which renders the plant or group of plants unsellable.

In some embodiments, one or more solutions may be provided to a user that are predicted to mitigate the pest infestation. In some embodiments, this involves generating a set of potential solutions that includes a set of products capable of mitigating the pest infestation. In some embodiments, such a set of potential solutions is generated based on an effectiveness rating for each product. An effectiveness rating may be specific to a particular classification of pest and/or plant type. In some embodiments, the set of potential solutions is an ordered set, where each of the products in the set is ordered based on its effectiveness rating. Once a set of potential solutions has been generated, the products in the set of potential solutions may be filtered based on preferences and/or requirements of the grow operation.

FIG. 1 depicts an exemplary context diagram 100 illustrating a pest distribution determination system for implementation in horticultural grow operations in accordance with embodiments. A horticultural operation may cover one or more locations, such as a greenhouse 102. A greenhouse 102 may have one or more grow operations 104 each with one or more plants 106. The individual greenhouses 102 and/or grow operations 104 can comprise an operation zone. In various embodiments, each grow operation 104 can comprise one or more operation zones. Additionally, two or more operation zones can partially overlap. The plants 106 can comprise a single type of plant or multiple types of plants. In various embodiments, a single grow operation 104 may include multiple plants in different locations/greenhouses 102. For the purposes of this disclosure, a grow operation 104 is any logical or a discrete group of plants 106 that are similarly situated such that the cultivation of each plant in the group is substantially similar.

In some embodiments, the grow operation 104 may include one or more pest collection mechanisms 108. A pest collection mechanism 108 may include any means of trapping or capturing and containing pests (e.g., insects, rodents, etc.). Such a pest collection mechanism can include but is not limited to any individual use or combination of adhesive traps, light traps, malaise traps, or barrier traps. For example, the pest collection mechanism 108 may comprise a "sticky trap" that includes a sheet coated with adhesive. A background of such a sticky trap may be brightly colored in order to allow for easy identification of pests caught in the sticky trap. In some embodiments, the grow operation 104 may contain a lighting source projecting on or near a pest collection mechanism 108 to be used to accelerate insect capture when the sun is down. The pest collection mechanism may be mounted to any suitable surface (e.g., the ground, a structural beam, a heat pipe, a stake, a wall, etc.). In embodiments that include pest collection mechanisms 108, such mechanisms may be spread throughout the grow operation at known locations.

One or more visual observer devices 110 are located at, and throughout, each grow operation 104. In various embodiments, the visual observer devices 110 include image capture devices that can be used to capture images of plants 106 (or discrete group of plants) and/or pest collection mechanism 108. In some embodiments, each individual plant or pest collection mechanism 108 may have one or more dedicated image capture devices. The image capture device may be a digital video camera or may be a still image camera configured to capture images periodically and/or on demand. The image capture device may also comprise a moving camera device. For example, a camera device may be located on an unmanned aerial vehicle (UAV), rails, or other suitable robotic transport. The visual observer device may also include any suitable environmental sensor, such as but not limited to a temperature sensor, light sensor, humidity sensor or CO2 sensor.

As noted above, each visual observer device 110 includes at least one image capture device that may be any device capable of capturing an image in one or more light spectrums and that can be used to obtain images in an automated or non-automated fashion. Such image capture devices can include, but are not limited to, cameras on smart phones, tablets, security cameras, web-cameras, or Raspberry Pi Cameras. Imaging devices may contain wireless hardware that can include but are not limited to 4G/5G/LTE, Wi-Fi, Bluetooth, NFC, LoRa, or Zigbee that can be used to transmit information back to a central computing device 112, part of a decentralized service platform 116, or to other image capture devices. In some embodiments, visual observer devices may contain the necessary hardware onboard to carry out all image and data processing, so as to create a decentralized processing network. In some embodiments, the visual observer device may contain a lighting source used during image capture that helps normalize the lighting variances commonly experienced in indoor or outdoor growing settings. More than one image capture device may be used to collect images of a pest collection mechanism 108 so as to provide better imaging quality or 3D information.

In some embodiments, a visual observer device may be configured to traverse the grow operation and capture images periodically and/or on demand. The visual observer device may include an image capture device (e.g., a camera). Generally, an image capture device may take visible light spectra pictures but may also extend to non-visible spectra such as infrared and ultraviolet. The image capture device may have an onboard application programming interface (API) enabling programmatic control. Alternatively, the image capture device may be networked thereby enabling remote control. The image capture device may be controlled via an image caption function. The image capture function may be a part of the image capture device and/or a part of a luminaire feedback device 108. In another implementation, the image capture function may be controlled by a visual observer device and/or hosted on a computing device.

A visual observer device may be positioned at any reasonable distance to any form of pest collection mechanism, using any means of mounting, such that an image of the pest collection mechanism can be collected by the included image capture device. A desirable distance from the lens of the camera to the pest collection mechanism can be determined by understanding the minimum focal distance of the camera, the minimum distance required to keep the entire pest collection mechanism in the field of view of the camera, and aiming to maximize the pixels per spatial unit at the plane or planes or the pest collection mechanism.

In various embodiments, the visual observer device 110 may transmit images and other information to a central computing device 112 that manages operation of the grow operation. Such images may include images of pests 114 having been captured in relation to one or more plants 106 and/or the pest collection mechanism 108. The images may also be associated with a location at which the image was captured. For example, the image may be an image of an instance of the pest collection mechanism 108 and may include a location of the camera at the time that the image is captured. In this example, the image may include images of some number of pests caught in the pest collection mechanism 108. In some embodiments, the central computing device 112 may forward the received image information 114 to a service platform 116. In some embodiments, the central computing device 112 may communicate with the service platform 116 via a connection established over a network 118.

In various embodiments, multiple grow operations 104 may be managed via the central computing device 112. As noted above, each grow operation 104 may include one or more visual observer devices 110 to monitor plants 106 and/or pest collection mechanisms 108 within the grow operation 104. Thus, the central computing device 112 can be operatively connected to, and/or communicate with, one or more visual observer devices 110. In some cases, the central computing device 112 can monitor and control the movement operations of one or more mobile visual observer devices 110 (e.g., UAVs) within the grow operation 104. The central computing device 112 may provide, without limitations, mission planning and/or safety oversight for several grow operations 104 concurrently using one or more mobile visual observer devices 110, wherein the grow operations 104 may not be near each other. The central computing device 112 may include one or more cameras to monitor the operation of the one or more mobile visual observer devices 110 within each respective grow operation 104, as well as the operation of the one or more mobile visual observer devices 110 while they are located outside of the grow operation (e.g., aisles, hallways, etc.) but within a greenhouse 102 or other target areas.

A service platform 116 may comprise a computing system in which at least a portion of the functionality described herein is implemented across one or more service computing devices 120. A service computing device 120 may either be a physical dedicated server or may be a virtual machine. In the latter case, the service platform 116 may be implemented on a cloud, such that the service computing devices 120 represent a plurality of disaggregated servers which provide virtual application server functionality and virtual storage/database functionality. The disaggregated service computing devices 120 may be physical computer servers, which may have a processor, a memory, an I/O interface and/or a network interface. In some cases, the disaggregated service computing devices 120 are optimized for the functionality attributed to the service platform 116 as described herein.

The service platform 116 may be configured to receive imagery and location information from a central computing device 112 and make at least one determination based on the determined problem. In some embodiments, the determination may be a determination of a risk of crop failure based on the determined problem. In some embodiments, the determination may be a determination of a solution to the determined problem. Such a solution may be determined based on preferences associated with the horticultural operation as well as effectiveness metrics associated with potential solutions. In some embodiments, the service platform may use one or more image analysis techniques as well as one or more machine learning techniques to determine a problem. This is described in greater detail elsewhere.

In some embodiments, the service platform 116 may be further configured to interact with a number of third-party computing devices 122. For example, the service platform 116 may be configured to provide pest distribution information 124 to a third-party computing device associated with risk assessment. In some embodiments, the service platform 116 may interact with one or more user devices associated with the horticultural operation. For example, the service platform 116 may provide information to a horticultural management device 126. In some embodiments, the service platform 116 may be in communication with a number of different horticultural management devices 126 and may provide different information to each of those horticultural management devices 126 based on a role associated with an operator of the device. For example, the information provided by the service platform 116 to a horticultural management device 126(A) operated by a user having a master grower role may be more extensive than the information provided by the service platform 116 to a horticultural management device 126(B) operated by a user having a field worker role. In some embodiments, the horticultural management device 126 may also act as a visual observer device 110. For example, an employee of the grow operation may capture one or more images throughout that grow operation which may then be transmitted to the central computing device for processing.

The illustrative computing system 100 may utilize at least one network 118 that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

The third-party computing devices 122 may be any suitable computing device operated by an entity unaffiliated with the horticultural operation and/or the service platform 120. In some embodiments, the third-party computing devices 122 may be operated by entities that provide services to the horticultural operation. In one example, the third-party computing devices 122 may be operated by an insurance provider that provides risk assessment/hedging. In another example, the third-party computing devices 122 are operated by a resource provider (e.g., a merchant) that offers for sale goods and/or services.

The horticultural management device 126 may be any networked computer, including mobile tablets over Wi-Fi and/or mobile tablets over a cellular network and/or laptop. The horticultural management device 126 may connect to the service platform 116, or directly to one or more components of the grow operation 104 via central computing device 112. For example, the horticultural management device 126 may connect to the visual observer devices 110, and/or other interfaces associated with the grow operation 104. In some embodiments, the horticultural management device 126 is configured to present information received from the service platform 116 to an operator. In some cases, such information may include an indication of a problem (e.g., a pest problem) and an associated location of that problem.

In some cases, such information may additionally include an indication of a proposed solution to the problem and/or instructions for addressing the problem. For example, one or more courses of action for remediation may be provided to a horticultural management device 126 that is operated by a master grower or other field workers responsible for at least one grow operation 104 and/or a worker who is to perform the actual tasks comprising a course of action for remediation. In one embodiment, all or a portion of the course of action for remediation may be displayed in a horticultural management device 126 for view and interaction by the master grower and/or other workers.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
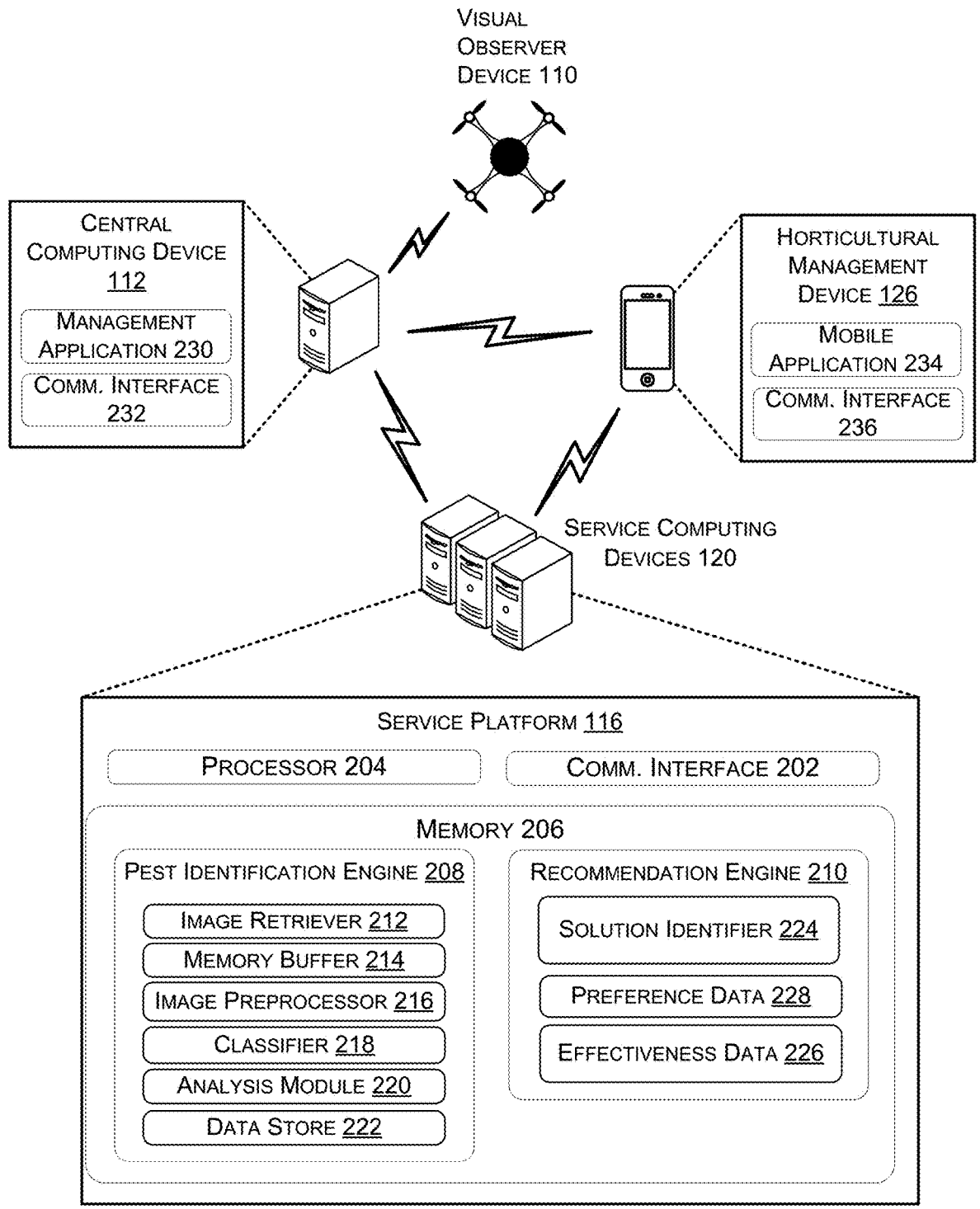
FIG. 2 is a block diagram showing various components of a system architecture that may be implemented to perform at least a portion of the functionality described herein.

FIG. 2 is a block diagram showing various components of a system architecture that may be implemented to perform at least a portion of the functionality described herein. The system architecture may include a service platform 116 that comprises one or more service computing devices 120. As noted elsewhere, the service platform 116 may be in communication with a central computing device 112 as well as one or more horticultural management devices 126. The central computing device 112 may further be in communication with one or more visual observer devices 110.

The service platform 116 can include any computing device configured to perform at least a portion of the operations described herein. The service platform 116 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The service platform 116 can include one or more virtual machines running virtual operating systems, or other computing architectures involving virtualization such as one or more flexible pools of logical storage devices that can be virtualized to maintain virtual storage devices for the computer. For example, the service platform 116 may include virtual computing devices in the form of virtual machines or software containers that are hosted in a cloud.

The service platform 116 may include a communication interface 202, one or more processors 204, memory 206, and any combination of hardware required to perform the functionality described herein. The communication interface 202 may include wireless and/or wired communication components that enable the service platform 116 to transmit data to and receive data from other networked devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the service platform 116 may implement functionality via one or more software modules and data stores. Such software modules may include routines, program instructions, objects, and/or data structures that are executed by the processors 204 to perform particular tasks or implement particular data types. The service platform 116 may include a pest identification engine 208 that analyzes imagery received from a central computing device 112 and identifies potential pest issues as well as a recommendation engine 210 that determines an appropriate recommendation to be presented in relation to the potential pest issue.

The pest identification engine 208 may be configured to, in conjunction with the processor 204, provide image analysis as well as problem identification. The pest identification engine 208 may comprise an image retriever 212, a memory buffer 214, an image preprocessor 216, a classifier 218, an analysis module 220, and a data store 222. The image retriever 212 is configured to receive captured images from the visual observer device 110, the central computing device 112, and/or other data sources of a grow operation (e.g., grow operation 104 of FIG. 1). The image retriever 212 may place one or more images into the memory buffer 214 where additional image processing services (e.g., image preprocessing, classification, analysis, etc.) may be applied.

The captured image in the memory buffer 214 may be persisted and aggregated into the data store 222. The data store 222 can comprise a data management layer that includes software utilities for facilitating the acquisition, processing, storing, reporting, and analysis of data from multiple data sources such as one or more visual observer device 110, the central computing device 112, horticultural management devices 126, and/or so forth. In various embodiments, the data store 222 can interface with an application programming interface (API) of another software application in order to obtain data.

In some embodiments, the pest identification engine may be configured to classify and count pests detected within an image. In some cases, this may involve the use of a classifier 218, which may comprise any suitable trained machine learning model. For example, the classifier may include any convolutional neural network backbone (which can include but is not limited to EfficientNet, ResNet, Res2Net, ResNet-Xt, MobileNet, DarkNet, VGG16, VGG16/19) or can be used in conjunction with a multi-scale feature aggregation module (which can include but is not limited to Feature Pyramid Networks (FPN), BiFPN, Atrous Spatial Pyramid Pooling module (ASPP)) which can be used in conjunction with an object detection head (which can include but is not limited to anchor-based modules, transformer modules, graph-based modules, fully convolutional anchor-free modules, or two stages approaches with region proposal networks and prediction modules as found in the R-CNN series object detectors) to localize and classify any number of bugs in a target image. The method of object detection is not limited to just convolutional neural networks and can include any machine learning algorithm or model used to interpret spatial data from an imaging sensor in any subset of measurable light spectrum. Other methods include using pure attention-based networks in conjunction with any of the aforementioned object detection modules, or image transformers (which can include but are not limited to Image GPT from OpenAI). It should be noted that if the chosen method for object detection requires training, any form of hinge loss, ranking loss, triplet loss, or contrastive loss can be used for training the classification module, which can significantly improve accuracy in fine-grained cases.

While a classifier 218 is described as being included in the pest identification engine, it would be recognized by one skilled in the art that some embodiments may not use such a classifier. For example, alternatives to object classification may be used here. In some cases, rather than explicitly localizing and classifying objects, machine learning models intended for counting can be used to provide a count for any desired number of species in the image. For example, one could use any classical computer vision method (which can include by is not limited to blob-detection, pixel clustering, watershed algorithm) to do a pure count of the number of insects, without providing any classification. In this case, basic information about blobs or clusters such as size or Hu Moments, can be used to provide a high-level understanding of what the insect could be. For example, a large moth will almost always be differentiable from a small fungus gnat when looking through the numerical lens of these simple metrics.

Once at least one pest and its corresponding count have been identified from image information (e.g., via the classifier 218), an analysis module 220 may be configured to determine one or more risks to be associated with the grow operation based on that identification. For example, the service platform may maintain a repository of pest information (e.g., data store 222) that includes destructiveness profiles for various pests with respect to different plant types. In this example, the analysis module 220 may determine a current plant type effected by the pest based on location information associated with the image and may then determine a risk based on a destructiveness profile for the pest based on that plant type. In another example, the service platform may maintain a repository of reproduction rates associated with various pests. In this example, the analysis module may determine a rate at which a pest infestation is likely to spread (e.g., based on information about the pest, environmental conditions, etc.). In some cases, the pest's destructiveness profile as well as the rate at which the pest is likely to spread may be used to determine a likelihood of crop failure.

In some embodiments, an identification of a pest as well as its respective count may be associated with a location at which a corresponding image was obtained. Such a pest count may represent a sampling of the pests at the respective location. The analysis module 220 may repeat this process for a number of different locations throughout a grow operation to assign a pest count to those different locations. Based on the determined pest counts at the number of different locations, the service platform may then generate a distribution model that illustrates pest distribution throughout the grow operation. In some embodiments, such a distribution model may be represented as a heat map that depicts concentrations of one or more pests. The distribution model may then be used to determine a risk of crop failure associated with the pest. In some cases, the generated distribution model may be compared to a distribution model generated at a previous date/time in order to determine a rate of change in a population of the pest. Such a rate of change may be determined based on a difference between the two distribution models with respect to time. For example, the difference in a volume of an area of concentration for a pest between two distribution models may be attributed to an increase or decrease in the population of the pest.

In some embodiments, a distribution model may be generated by the analysis module using a Monte Carlo algorithm. A Monte Carlo algorithm is a broad class of computational algorithms that rely on repeated random sampling to obtain numerical results. Monte Carlo methods such as Kalman filters, Ensemble Kalman filters, particle filters, or any other type of Sequential Monte Carlo methods can be used to provide a distribution model over time. If using Bayesian, or other type of uncertainty-aware deep learning is used, for the detection and classification of insects, estimated probability distributions can be used to bootstrap any of these methods.

In some embodiments, the analysis module may use a Graph Neural Network (GNN) to create such a distribution model. In these embodiments, each pest count associated with a location (node) throughout a facility may be treated as a vertex on a graph. One can then utilize a GNN to provide a robust estimate of the state of any one vertex. In some embodiments, one or more other distributions may be provided to a GNN as input. For example, distribution models may be generated at various points in time and previously-generated distributions models may be provided as input to generate current distribution models. In such embodiments, features used at every vertex can also include the output features of the GNN at a previous point in time in an autoregressive manner in order to give a better temporal understanding of the pest distribution over time. The GNN may also be used to provide classifications of emerging patterns or events across a grow operation. For example, it may indicate that three nodes in the southwest corner of the facility are experiencing a fungus gnat infestation, or that there are no threats present in the north-east corner of the of a field.

In some embodiments that use a GNN, neighboring vertices can often times give insight into the state of other neighbors, which can further be used to improve the accuracy of any given vertex/node. Due to the high-dimensional nature of any grow operation, it is unlikely that relationships of a node to any subset of neighboring nodes can be approximated with a good heuristic. Rather, if any relationship exists between nodes, it may need to be learned from data over time. Any relationship for a facility can be learned through any capable method, which could range from simple covariance estimates between graph nodes, to using neural networks to use the temporal feature data of a node or group of nodes to predict the features of other nodes. This is a highly tangible approach, as no labeled data needs to exist, it can be trained in an unsupervised way. It follows that if a set of node combinations are deployed into a growing area, one can learn the intra-node relationships, and subsequently remove a large number of traps to reduce data traffic and reuse the devices elsewhere. A simple example: deploy 100 insect traps across the facility, learn intra-node relationships, and prune to only 10 insect traps. Using this method, one can predict the state of insects at a high spatial granularity using a GNN and a small number of insect traps. This concept might be extended to locations without traps. For example, in the scenario that UAVs are used to capture images of insects on plants (i.e., in contrast to capturing an image of a trap), the system may create correlations between various locations, such that sampling of an insect population can be optimized by reducing the number of locations that should be checked.

The recommendation engine 210 may be configured to, in conjunction with the processor 204, provide a recommendation for one or more potential courses of action for remediation based upon an identified problem. Upon identifying at least one course of action for remediation, the recommendation engine 210 may interact directly with a horticultural management device 126, a central computing device 112, or other components used in the grow operation 104. For example, the recommendation engine 210 may transmit commands to the central computing device 112, which may then provide instructions to one or more UAVs to fly over a particular path within the grow operation 104 to capture images, collect other sensor data, or execute remedial action. In another example, the recommendation engine 210 may transmit to the horticultural management device 126 information related to problem identification as well as an indication of a recommended solution. In various embodiments, the recommendation engine 210 can request additional information from the central computing device 112 and/or horticultural management device 126.

The recommendation engine 210 may include a solution identifier module 224 that is configured to identify a set of potential solutions corresponding to a pest infestation identified via the analysis engine 208. Such a set of potential solutions may include any good and or service determined to be effective against the identified pest. In some embodiments, the service platform may maintain effectiveness data 226 for a number of potential solutions. In some embodiments, each potential solution may have different associated effectiveness ratings with respect to different pests. In some embodiments, effectiveness ratings for a potential solution may vary by region and/or plant type. In these embodiments, the solution identifier may identify a set of potential solutions that each have an effectiveness rating for the pest that is greater than some threshold value. The set of potential solutions is then ordered based on that effectiveness rating. In some embodiments, the set of potential solutions may then be filtered based on preference data 228 stored in association with the grow operation. In some embodiments, various weights may be assigned to the set of potential solutions based on the preference data 228, such that the order of the solutions in the potential solutions may be altered. Once a set of potential solutions has been generated, the recommendation engine 210 may present some subset of the set of solutions to a user (e.g., via the horticultural management device 126). For example, the top three potential solutions in the ordered set of potential solutions may be presented to the user.

The central computing device 112 may be any suitable computing device configured to perform at least a portion of the functions described herein. In some embodiments, the central computing device 112 may include a management application 230 that manages operations for a horticultural project. For example, the central computing device 112 may provide instructions to one or more unmanned vehicles (e.g., the visual observer device 110) to cause them to carry out horticultural operations (e.g., collect imagery, spray pesticides, etc.). Additionally, the central computing device 112 may be configured to collect and monitor information related to plant health within the grow operation. The central computing device 112 may include a communication interface 232 that enables the central computing device 112 to communicate with various other electronic devices, such as the service platform 116, one or more horticultural management devices 126, and one or more visual observer devices 110.

The horticultural management device 126 may be any suitable computing device configured to present information to one or more users. In some embodiments, the horticultural management device 126 may include a display screen capable of presenting information to a user in the form of a graphical user interface (GUI). In some embodiments, the GUI may be implemented upon execution of a mobile application 234 that facilitates interaction between the horticultural management device 126 and the central computing device 112 and/or service platform 116. Such interaction may be enabled via a communication interface 236 of the horticultural management device 126.

It should be noted that while a number of functions and modules are depicted as being included within the service platform, at least some of the functionality attributed to such functions and modules may be performed by an electronic device outside of the service platform. For example, at least a portion of the pest classification functions can be performed by the visual observer device 110.

Figure 3:
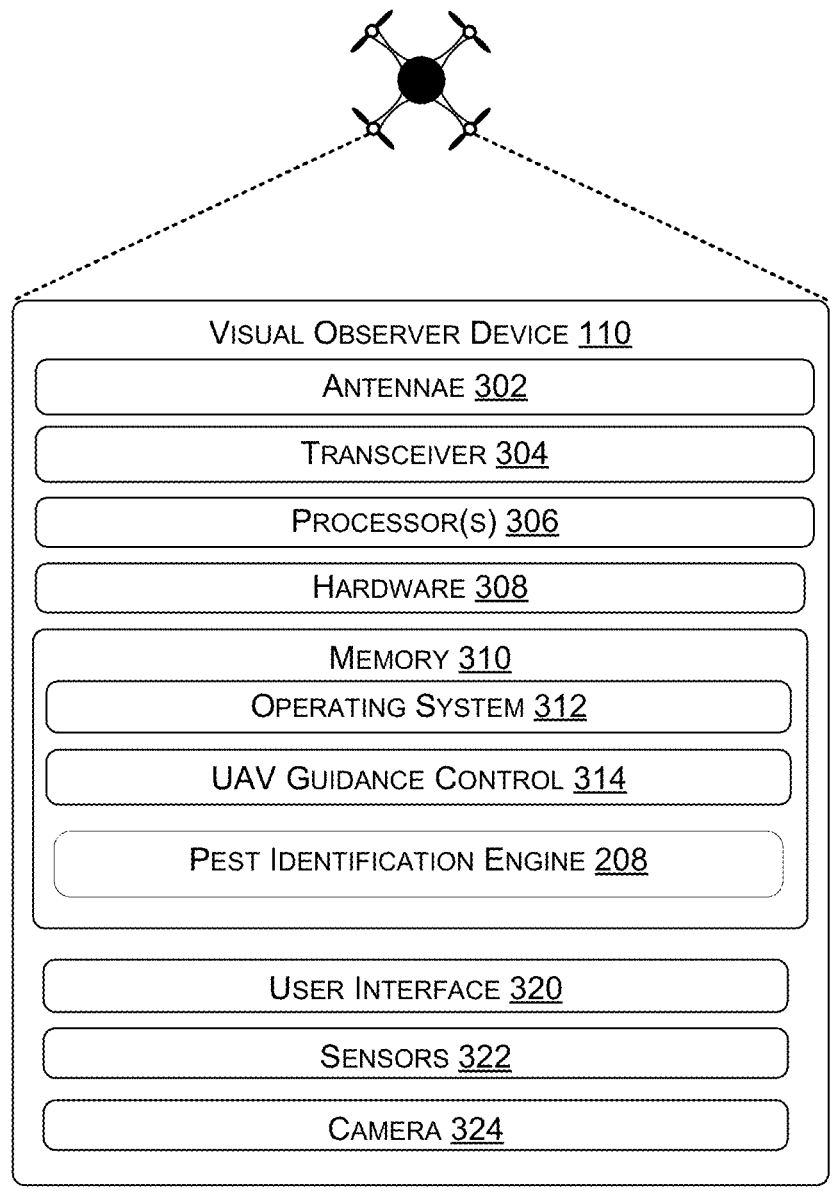
FIG. 3 illustrates an example of a visual observer device 110 that is an unmanned vehicle for use in horticultural operations as provided herein.

FIG. 3 illustrates an example of a visual observer device 110 that is an unmanned vehicle for use in horticultural operations as provided herein. The visual observer device 110 may operate with a ground-based air traffic control (ATC) system. The visual observer device 110 may include, among other components, one or more antennas 302, transceiver 304, one or more processors 306, hardware 308, and memory 310. In some embodiments, the antennas 302 include an uplink antenna that sends radio signals to one or more UAVs 302. In addition, there may be a downlink antenna that receives radio signals from the one or more UAVs 302. In other embodiments, a single antenna may both send and receive radio signals. These signals may be processed by a transceiver 304 that is configured to receive and transmit data.

The visual observer device 110 may include one or more processors 306, which may be a single-core processor, a multi-core processor, a complex instruction set computing (CISC) processor, or another type of processor. The hardware 308 may include a power source and digital signal processors (DSPs), which may include single-core or multiple-core processors. The processors may perform an operation in parallel to process a stream of data that may be provided by various sensors 322.

The hardware 308 may also include network processors that manage high-speed communication interfaces, including communication interfaces that interact with peripheral components. The network processors and the peripheral components may be linked by switching fabric. The hardware 308 may further include hardware decoders and encoders, a network interface controller, and/or a universal serial bus (USB) controller.

In various embodiments, the visual observer device 110 may include various integrated sensors. For example, a sensor may be one that is built into the visual observer device 110. In various embodiments, the sensors 322 of the visual observer device 110 may include a LIDAR system to determine a position of the UAV and/or to monitor the environment in which the UAV is operating. The visual observer device 110 may also comprise a camera 324 to capture images of the grow operation according to a field of view. In one example, the camera 324 is a wide-angle camera to capture a large field of view. In this example, the images captured by the camera 324 may be divided into multiple sub-pictures, where the sub-pictures are processed separately.

The memory 310 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other the memory may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 310 may store various software components that are executable or accessible by the processor(s) 306. The various components of the memory 310 may include software and an operating system 312. Each module may include routines, program instructions, objects, and/or data structures that perform particular tasks or implement particular abstract data types.

The software may enable the visual observer device 110 to perform functions to guide UAVs and control hardware components, including the sensors 322 and camera 324. In various embodiments, the software may provide various functions, such as directly or indirectly instructing the UAV to change its position, when to trigger the capture of an image of a plant or insect trap, and/or so forth.

The UAV guidance control 314 is configured to generate one or more navigation/control commands to wirelessly transmit to the UAV via transceiver 304. The navigation commands may include commands to control thrust, yaw, pitch, roll, etc., of the UAV such that the UAV follows the predefined path. The predefined path can be within a grow operation or across multiple grow operations. In this way, the UAV can navigate from one operation zone to another operation zone.

In some embodiments, the visual observer device 110 may include a pest identification engine 208 that is similar to the pest identification engine 208 described above with respect to FIG. 2. In other words, the visual observer device 110 may be capable of performing at least a portion of the pest classification functions described above with respect to the service platform 116. In these embodiments, the visual observer device 110 may perform the pest classification functions and transmit pest classification and count data to the service platform.

It should be noted that while FIG. 3 depicts a visual observer device 110 as an unmanned aerial vehicle, one skilled in the art would recognize that alternatives are available. For example, the visual observer device may be a stationary camera device, a camera device that is transported via rails, or a grounded unmanned vehicle. Such embodiments should be considered equivalents for the purposes of this disclosure. In another example, the visual observer device may be a horticultural management device or other suitable mobile device operated by an agent/employee of the grow operation. In this example, the agent/employee may capture images throughout the grow operation that may be used to generate a distribution and pest infestation information that is then provided back to the mobile device.

Figure 4:
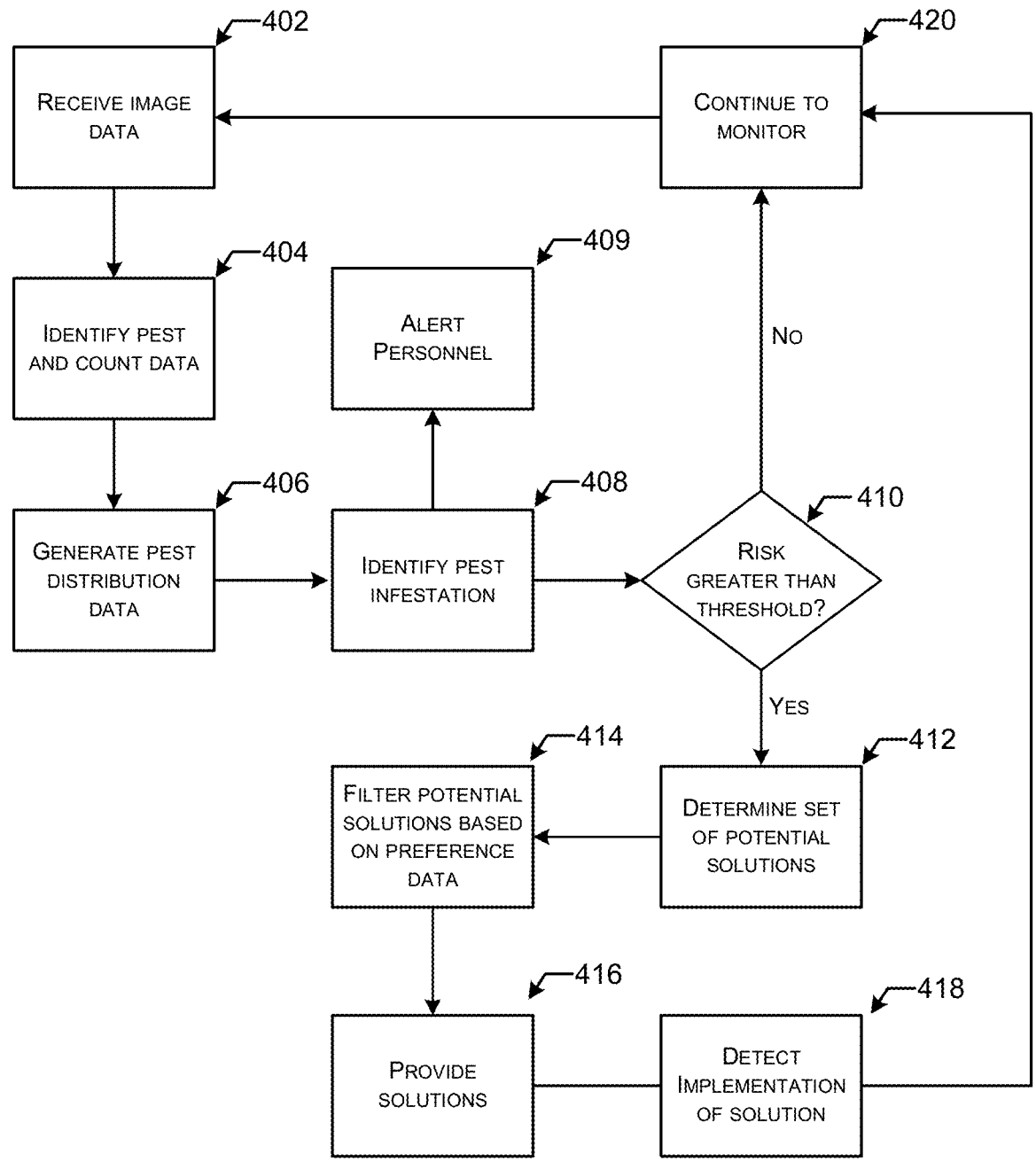
FIG. 4 depicts a block diagram illustrating an example process for identifying a risk associated with a pest infestation and providing a recommendation to resolve that pest infestation.

FIG. 4 depicts a block diagram illustrating an example process for identifying a risk associated with a pest infestation and providing a recommendation to resolve that pest infestation. The process 400 may be performed by a service platform, such as the service platform 116 as described with respect to FIG. 1 and FIG. 2, based on image data collected and provided by a visual observer device.

At 402, process 400 comprises receiving image data collected by one or more visual observer devices throughout a grow operation. Each of the received image data is associated with a location at which the image data was captured. In some embodiments, the location information is provided by the visual observer device itself. In some embodiments, the location information is determined using images captured of the visual observer device by one or more cameras located throughout the grow operation. The image data may include an image of an insect trap (e.g., a pest collection mechanism as described elsewhere) or a portion of a plant.

In some embodiments, the visual observer device may comprise a stationary camera device located at a fixed position. For example, a stationary camera device may be oriented to, upon activation, obtain image data that includes a representation of a pest collection mechanism (e.g., an insect trap). In some embodiments, the visual observer device may comprise a mobile electronic device, such as an unmanned vehicle (either aerial or grounded) or a camera device capable of being moved via a rail system.

At 404, process 400 comprises identifying one or more pests as well as respective count data within the received image data. Each pest and respective count may be determined using a classifier and image processing. In some embodiments, a number of different entity (e.g., pest) classifications may be identified within each image, and respective counts for those classifications may be generated by counting each instance of each classified entity. Each entity classification is then stored in association with its respective count and the location at which the image was captured.

In some embodiments, additional data may be collected during this step. For example, in addition to determining pest classification and count data, the system may collect and process spatial characteristics for a pest. For example, the system may determine a size of the pest based on its three-dimensional volume or its two-dimensional surface area (e.g., within an image). In some embodiments, the size of a pest may be determined based on a length of a major axis through a body of the pest. Additionally, the system may collect information on insect maturity. For example, the system may (e.g., using a classifier) identify a level of development for various portions of the pest and may determine, based on the level of development, a maturity of the pest. In some embodiments, such data may be used in tandem with pest classification and count data.

At 406, process 400 comprises generating pest distribution data. In some embodiments, this may involve interpolating and/or extrapolating data throughout an area associated with a grow operation. Note that interpolation refers to the process of generating data points between already existing data points, whereas extrapolation is the process of generating points outside a given set of known data points. In the current case, the known data points are data points at which stored classification and count data has been determined. One skilled in the art would recognize that a number of suitable interpolation/extrapolation techniques would be suitable for generating such distribution data. In some embodiments the grow operation may be treated as a two-dimensional (2D) space and interpolation/extrapolation techniques suitable for such a 2D space may be used to generate the distribution data. For example, a spline interpolation technique may be used to interpolate likely pest classification count values across the grow operation based on the determined pest classification and count data associated with particular locations throughout that grow operation. In some cases, interpolation of data between various particular points may be governed by a function that represents a relationship between the various points. In some cases, such a relationship may be learned using one or more machine learning techniques.

At 408, process 400 comprises identifying a potential pest infestation as well as potentially determining a level of risk associated with such a pest infestation. In some embodiments, a potential pest infestation may be identified based on a variance between an expected count for a pest classification and a determined count for a pest classification. For example, upon generating distribution data, count values for various points within that distribution data may be compared to count values for those same points within distribution data generated at a previous time or a baseline distribution data. In this example, if a difference between one or more of the compared count values is positive and greater than some threshold value, then a potential pest infestation may be identified at the location/locations associated with the one or more compared count values. In some embodiments, the threshold value may vary by pest classification type. For example, the threshold value may be lower for more aggressive/invasive species of pests. In some embodiments, a pest infestation may be determined based on a rate of change in the pest population determined at one or more points within the distribution data.

Once a potential pest infestation has been identified, a risk (e.g., of crop failure) may be determined for that potential pest infestation. In some embodiments, this may involve determining a plant type associate with the location of the potential infestation and retrieving a destructiveness profile associated with the pest with respect to the plant type. For example, in embodiments in which a destructiveness profile is an indication of a volume of a plant type that is/can (on average) be consumed per population of pest over time, a risk may be calculated by first determining a volume of plant likely to be consumed. This may involve multiplying a determined population of pest classification by the destructiveness profile for a particular plant. This can be compared to a total volume of the plant, which may be determined based on plant age and information stored about the plant type.

It should be noted that a destructiveness profile may not be a static value. For example, a destructiveness profile may be represented by a mathematical function, in that a value for the destructiveness profile may be calculated dynamically using information about the grow operation. In this example, such a destructiveness profile may be impacted by any suitable characteristic of the grow operation. For example, such a function may take as input values representing characteristics such as a temperature (or average temperature), a geographical region, an altitude, resource availability (e.g., gas/oxygen levels), soil type, or any other suitable information related to the grow operation. In some cases, a risk associated with a potential pest infestation may be calculated as a percentage or probability. For example, a risk of crop failure associated with a potential pest infestation may be calculated as a percentage probability that the pest will consume enough of the crop in the grow operation that the crop will be unable to recover.

A level of risk associated with a pest infestation may be calculated as a function of the rate at which the pest is likely to spread/reproduce as well as a volume of crop that is typically consumed by the pest (which may be reflected in the destructiveness profile for the pest). In some embodiments, the rate at which the pest is likely to spread/reproduce may be determined based on reproduction values stored in relation to that pest. In some embodiments, the rate at which the pest is likely to spread/reproduce may be determined based on past rate of change data for the pest determined from distribution data. It should be noted that reproduction rates may often be represented by an exponential curve rather than linearly. The rate of change may then be used to determine a likely population at some point in the future. The likely population may then be used to determine a volume or number of plants (of each type) that are likely to be consumed or otherwise destroyed by the pest based on the destructiveness profile.

In some cases, information stored about particular types of plants may include data about a minimum number of those plant types that are required to maintain the grow operation. In these cases, if the number of plants in the grow operation drops below the minimum number, a crop consisting of the plant type will be determined to have failed. Accordingly, a risk of crop failure may represent a probability that, without intervention, a pest infestation will result in instances of the plant type falling below the minimum number of plants required.

In some embodiments, upon identifying a pest infestation within a grow operation, the process may comprise alerting one or more personnel of the grow operation as to the presence of the pest infestation at 409. The personnel (e.g., a grower and or team of workers present in the greenhouse) may be alerted via software executed on a horticultural management device (e.g., a mobile phone/tablet) that each individual has, personal computers that they may have, or kiosks spread throughout the grow operation. It is important to note that is not limited to these mediums. Regardless of the medium used, alerting on risk thresholds or binary pest presence may be delivered through a mobile application, web-based application, email, text-message, or any form of digital communication. The alerts may contain metadata regarding the classifications, distribution, location, breadth, and or risk/severity of the infestation.

In some embodiments, the determined risk associated with the potential pest infestation is provided to a third-party entity. For example, the determined risk associated with the potential pest infestation may be provided to an insurance agency or other entity responsible for assessing an overall level of risk tied to the grow operation. In some embodiments, at 410, process 400 comprises determining whether the determined risk is greater than some threshold risk value, above which intervention may be required.

Upon determining that the risk is greater than the threshold risk value ("yes" from decision block 410), the process 400 comprises determining a set of potential solutions at 412 or process 400. In some embodiments, a database of potential solutions may include a number of different products (e.g., goods and/or services) or actions determined to result in removal of various. Each product and/or action may be associated with an effectiveness rating representing that product's effectiveness against a particular pest classification (and when used on a particular type of plant). In some embodiments, generating a set of potential solutions comprises identifying the top X number of solutions having the highest effectiveness against the particular pest classification, where X is some predetermined integer value. In some embodiments, the set of potential solutions may be generated to comprise all products/actions from the data store having an effectiveness rating (with respect to the particular pest) greater than some threshold effectiveness rating. In some embodiments, the set of potential solutions may be ordered based on effectiveness ratings. For example, the set of potential solutions may comprise an ordered set of products, where the product having the highest effectiveness rating appears at the top and the product having the lowest effectiveness rating appears at the bottom.

At 414, process 400 comprises filtering the set of potential solutions based on preference data. In some embodiments, a grow operation or manager may be associated with one or more preferences and/or requirements. For example, a grow operation may be required to refrain from using certain products in order to maintain an "organic" or "non-GMO" certification of the crop. In this example, all such products may be filtered out of the set of potential solutions that are presented to the grow operation. In some embodiments, products within the set of potential solutions may be reordered based on preference data. For example, a grow operation may indicate that price is an important factor in identifying a solution to be implemented. In this example, a metric that includes price or an effectiveness/price ratio may be determined for each product in the set of solutions, and the products in the set of potential solutions may be reordered based on that metric.

At 416, process 400 comprises providing at least one solution from the filtered set of solutions to another entity. In some embodiments, the top X solutions from the filtered set of potential solutions are presented to a user associated with the grow operation. In these embodiments, the solutions may be presented via a horticultural management device operated by the user. In some embodiments, the presentation of the solution may be accompanied by an indication of the determined pest infestation and/or a location of a pest infestation. In some embodiments, the user is presented with products available for sale from a third-party provider of goods or services, such as an electronic retailer.

In some embodiments, one or more solutions from the set of potential solutions is provided to an entity that automatically implements the one or more solutions. For example, the process 400 may result in providing instructions to a UAV (or other robotic device, such as a robotic sprayer) to cause it to apply a product to an area of the grow operation affected by the pest infestation. In another example, the process may involve automatically placing an order for a product associated with the top solution in the set of potential solutions. In this example, the process may automatically order a good or service from a third party on behalf of the grow operation. In some embodiments, the process may involve automatically purchasing a risk mitigation product (e.g., insurance) related to the pest infestation.

At 418, process 400 comprises detecting an implementation of the provided solution. In some embodiments, this may involve receiving a selection (and purchase in some cases) of a product by a user from the set of potential solutions. In some embodiments, this may involve determining that a user associated with the grow operation has arrived at a location associated with the pest infestation. In some embodiments, this may involve receiving feedback from a component of the grow operation (e.g., a UAV) that the instructed course of action has been completed.

After detecting an implementation of a solution or upon determining that the risk is not greater than the threshold risk value ("no" from decision block 410), the process 400 comprises continuing to monitor the grow operation at 420. Particularly, the process may involve repeating the various steps described above in order to determine whether the pest population has decreased in size, remained the same in size, or increased in size. In some embodiments, a predicted change in size for the pest population may be calculated based on the effectiveness rating associated with the selected product. In these embodiments, the process may further involve updating the effectiveness rating based on the actual change in pest population. In some embodiments, effectiveness of a particular solution can also be measured by the described system. Once the system had made a recommendation and it has been implemented (e.g., by the grower or autonomous device), the same visual observer devices that detected the pests can indirectly or directly measure the effects of the treatment. Examples of direct measurement would be to continue measuring the pest distribution at the location(s) in question. An indirect method could be to measure plant growth or other physical characteristics that are potentially coupled to the presence of pests.

In some embodiments, information collected during the process 400 may be applied to one or more machine learning algorithms in order to learn or adjust various data used in the process 400. For example, a phenotyping system may include at least one machine learning model that can be used to observe and quantify risk metrics (e.g., the volume of plant a pest can consume or the number of plants a pest can spread to, per a unit of time), which can then be correlated based on the pest information received via the process 400. This phenotyping system may provide more accurate information to be included in a destructiveness profile associated with a pest classification. This may also provide a way to discover new types of risks induced by the presence of the pest, depending on the granularity and number of analysis metrics the phenotyping system has to offer.

It should be noted that while the above process focuses on identifying risks associated with a pest (e.g., a harmful biological entity) population, some embodiments may identify a risk of crop failure associated with a population of beneficial entities. For example, a risk of crop failure may instead be determined based on a decline or collapse of a beneficial insect population (e.g., bees or other pollinating insects). Accordingly, one skilled in the art would recognize that the techniques described herein may be applied equally to a determining a risk (e.g., of crop failure) associated with a collapse of beneficial biological agents.

Figure 5:
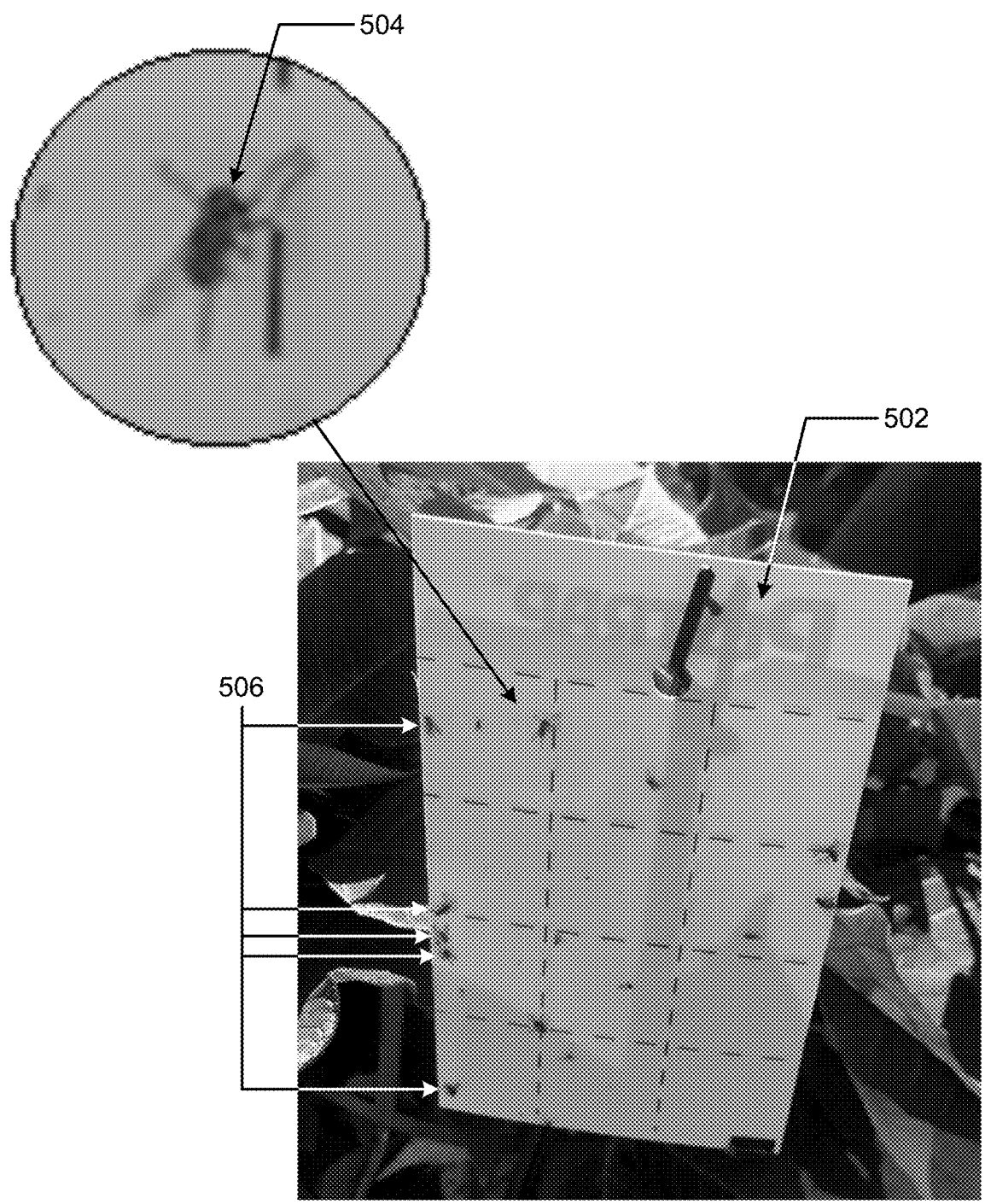
FIG. 5 depicts an example of a pest collection mechanism that may be implemented in a grow operation in accordance with at least some embodiments.

FIG. 5 depicts an example of a pest collection mechanism that may be implemented in a grow operation in accordance with at least some embodiments. More particularly, FIG. 5 depicts an example of an adhesive insect trap 502. An adhesive insect trap 502 comprises a sheet of some material that is at least partially covered in an adhesive. Insects that land upon the adhesive are caught in the insect trap and would be visible to a visual observer device that views the adhesive insect trap.

In accordance with embodiments as described herein, a visual observer device may capture an image of the adhesive insect trap 502. The image may then be processed using one or more object recognition techniques to identify a number of pest objects 504 within the image. Each of the identified pest objects is then classified into a type or category of pest. This step is repeated for each of the pest objects identified within the image of the adhesive insect trap.

Once each of the identified pest objects 504 have been classified, count data is generated for each different classification of pest by identifying each instance 506 of that classification of pest within the image. In some embodiments, the classification and count of pests within the image may be performed by the visual observer device itself. In some embodiments, the visual observer device may transmit the captured image to the service platform (e.g., by way of a central computing device) which then performs the classification and count of pests within the image. In some embodiments, the visual observer device may use object detection to identify portions of an image that contain a potential pest object (e.g., 504) and may transmit at least that portion of the image to the service platform. In these embodiments, the service platform may perform the classification and counting of pests based on the received portions of the image.

As noted elsewhere, classification and count data for pests is then stored in association with a location at which the image was captured. In some embodiments, the count data is adjusted for a particular location based on previously-collected count data in order to account for the insect trap not having been replaced. For example, if an image captured at time $T_1$ depicts five of a particular type of pest, and a second image captured at a subsequent time $T_2$ depicts seven of that particular type of pest at the same location, then the count associated with time $T_2$ may be adjusted to two (7−5=2) since five of the pests had already been counted. In some embodiments, a user may indicate that a fresh trap has been placed at the location, and a future count may not take into account past counts.

Figure 6:
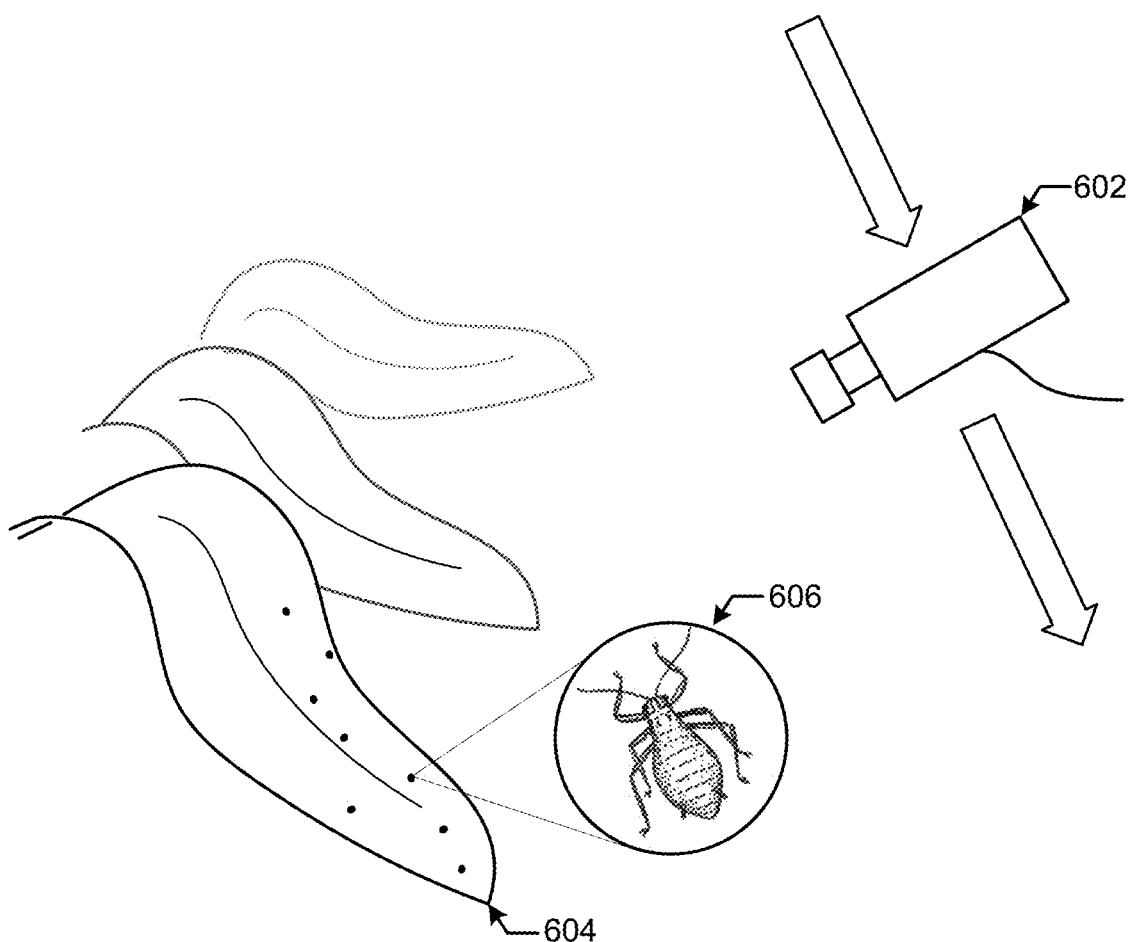
FIG. 6 depicts an example of a process by which images of plants may be used to classify and count pests in accordance with at least some embodiments.

FIG. 6 depicts an example of a process by which images of plants may be used to classify and count pests in accordance with at least some embodiments. In FIG. 6, a camera of a visual observer device 602 may be positioned some distance away from a plant, such that the camera is able to capture images of at least a portion of that plant 604 (e.g., a leaf, stem, flower, etc.). In some embodiments, the visual observer device 602 further includes a light source capable of illuminating objects on the portion of the plant 604.

In embodiments, the images captured by the camera of the visual observer device are processed using one or more object recognition techniques. In these embodiments, an identified object 606 may be classified as a pest. Multiple of such objects may be classified in such a manner, and count data may be determined for each pest classification type.

In some embodiments, the visual observer device 602 traverses a grow operation. In at least some of these embodiments, the camera of the visual observer device 602 continues to capture images of various plants as the visual observer device traverses the grow operation. For example, the camera of the visual observer device may capture streaming video data that includes images of portions of various plants as the visual observer device passes those plants. Along with the streaming video data, the visual observer device may also transmit location data corresponding to the captured streaming video data. In these embodiments, pest classification and counts are determined from the received streaming video data and associated with the location corresponding to the streaming video data at the time that the pests appear in the streaming video. In this manner, the service platform may continuously classify and count pests throughout multiple points within the grow operation.

Figure 7:
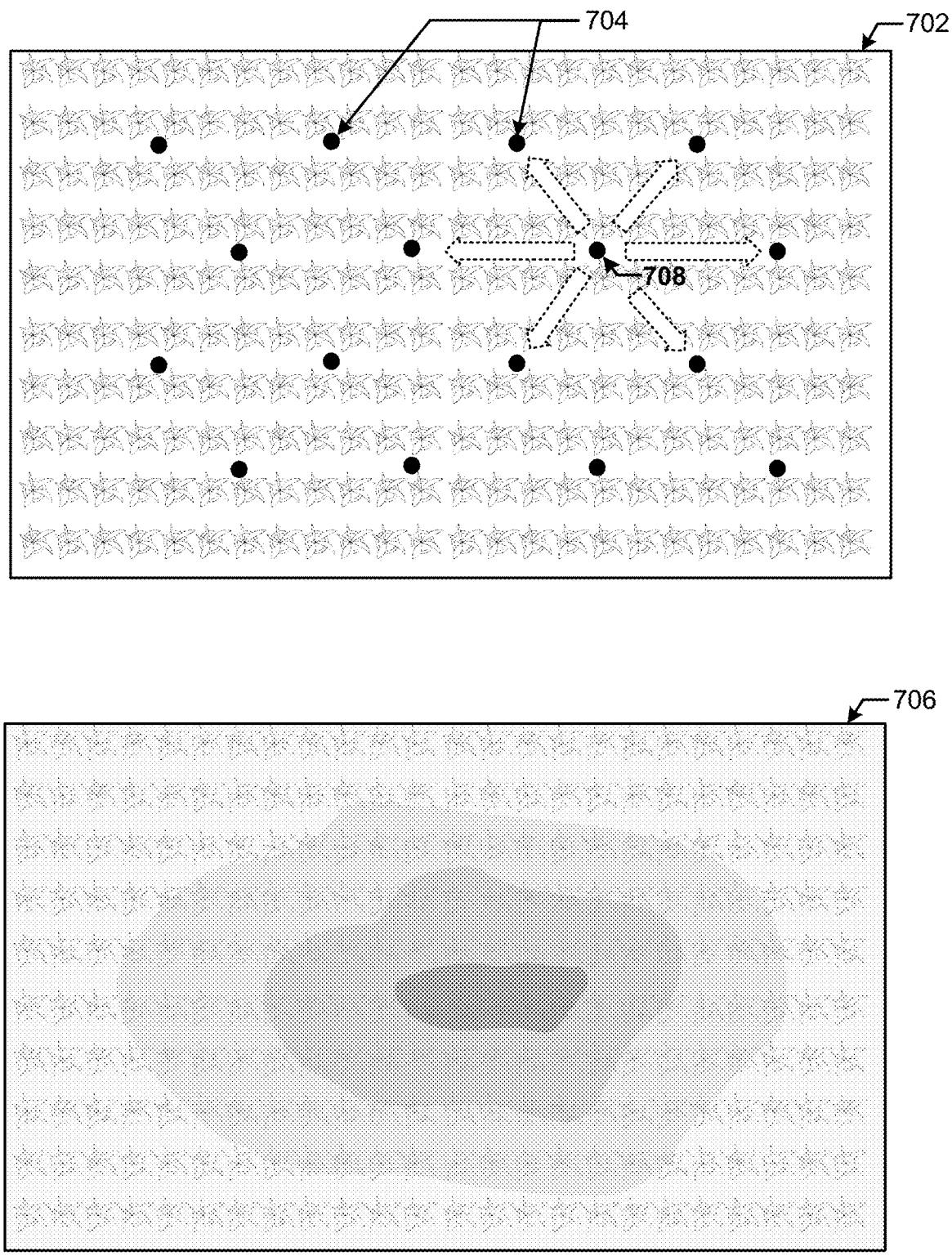
FIG. 7 depicts an example of graphical representation of a process for generating distribution data for a pest based upon collected imagery in accordance with at least some embodiments.

FIG. 7 depicts an example of graphical representation of a process for generating distribution data for a pest based upon collected imagery in accordance with at least some embodiments. In some embodiments, a service platform may maintain information related to a grow operation that includes plant location data 702 (e.g., a map). In some embodiments, the plant location data includes information on types of plants by location as well as other information such as plant maturity, plant health, or any other status information.

In some embodiments, pest classification data and count data are obtained with respect to a number of different data collection points 704 throughout a grow operation based on images collected at the different data collection points 704 (e.g., using a classifier). A data collection point 704 may comprise a location within the grow operation associated with one or more of the received images. In some cases, data collection points may be fixed at particular locations throughout a grow operation. For example, each data collection point 704 may represent a location within the grow operation at which an insect trap is located. In some cases, data collection points may be dynamic. For example, as an image is received from a visual observer device, a location determined to be associated with that image is treated as a data collection point. In addition to being associated with one of the data collection points 704, the pest classification data and count data are further associated with a time at which the pest classification data and count data are obtained.

In some embodiments, distribution data 706 may be generated from the pest classification data and the count data using the respective location of each point 704 associated with that classification data and count data. Distribution data 706 may comprise any indication of a likely distribution of pest population across an area. In some embodiments, the pest count data at each of the points 704 is interpolated to areas of the grow operation for which count data is unavailable.

In FIG. 7, the distribution data 706 is illustrated as a heat map by which a density (or congestion level) of pests at a location within the distribution data is illustrated via an intensity or darkness of the heat map at that location. In some embodiments, the distribution data 706 may be graphically presented (e.g., via a horticultural management device) as an overlay to the plant location data 702. It should be noted, however, that distribution data 706 may comprise any suitable form. For example, distribution data 706 may comprise a text-based document that includes count data by location.

In some embodiments, distribution data (e.g., distribution data 706) may be generated by interpolating population values to areas of a grow operation for which population count data is unavailable (e.g., has not been collected). In some embodiments, the service platform stores one or more relationships between various data collection points 704. For example, relationship information may be stored in association with data collection point 708 and each of its neighbors. In this example, when pest count data is determined from images associated with data collection point 708, expected pest count data may be generated for each data collection point neighboring data collection point 708 based on the stored relationship data. In this example, a potential pest infestation may be detected when the expected pest count data for neighboring data collection points does not match pest count data determined from images collected at those data collection points. In some embodiments, relationships between various data collection points may be learned using one or more machine learning techniques.

Figure 8:
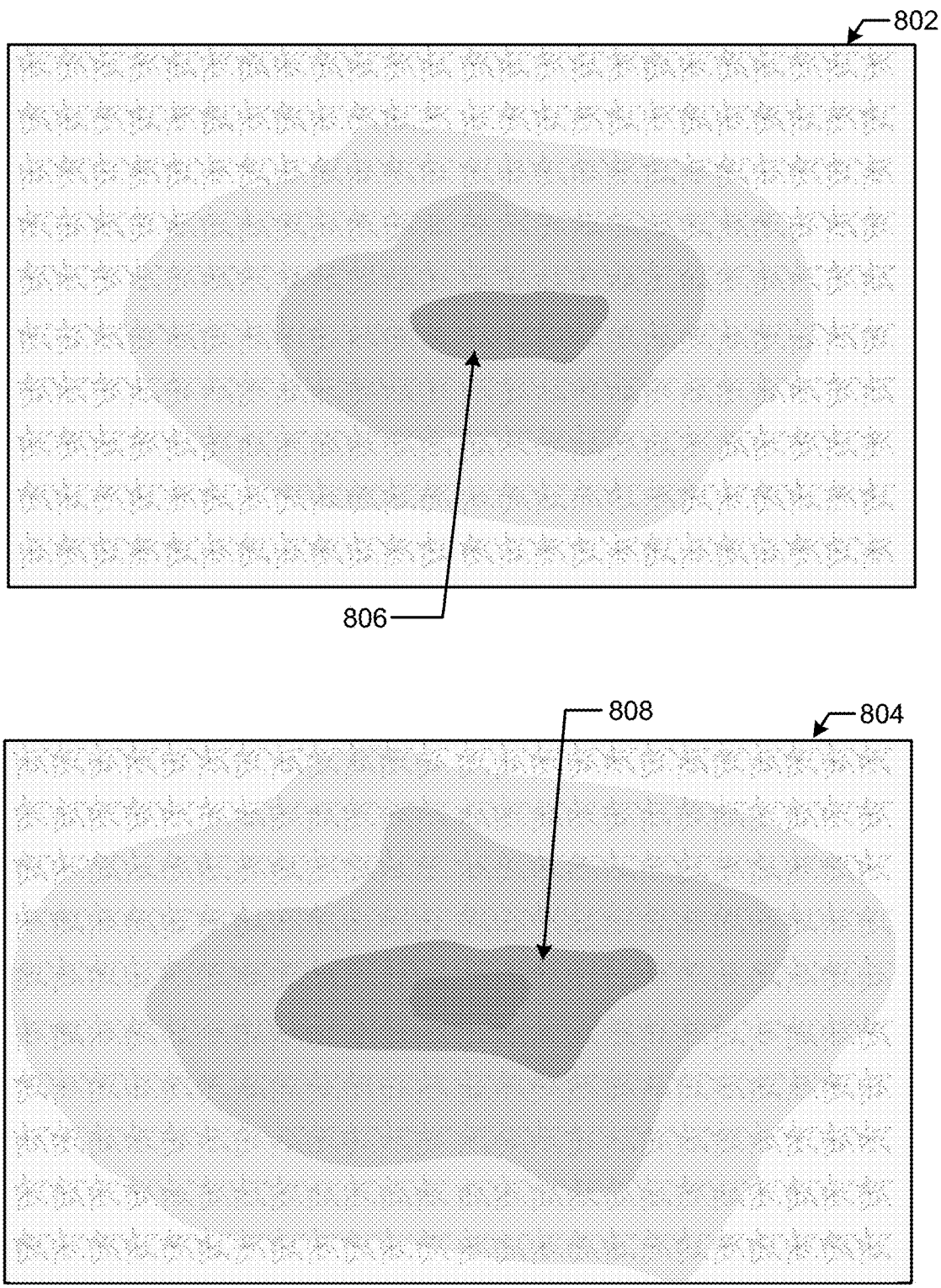
FIG. 8 depicts a graphical representation of a process for determining a rate of change in a pest population based on distribution data generated with respect to time.

FIG. 8 depicts a graphical representation of a process for determining a rate of change in a pest population based on distribution data generated with respect to time. As depicted in FIG. 8, two separate instances of distribution data may be generated at two separate points in time. More particularly, distribution data 802 may be generated at time $T_1$, and distribution data 804 may be generated at time $T_2$. Each of distribution data 802 and 804 may include information about a distribution of a pet population throughout an area or region (e.g., a greenhouse).

As noted elsewhere, distribution data may include information on a density of a pest population throughout an area. The density information may be used to determine a rate of change (either positive or negative) in the population of a pest. In some embodiments, a total population of the pest may be determined by aggregating the pest population information within the distribution data. A total pest population at time $T_1$ may be compared to the total pest population at time $T_2$ to determine a rate of change as a function of the difference in population between distribution data 802 and 804 with respect to the difference in time between time $T_1$ and time $T_2$.

In some embodiments, a volume of area 806 of the distribution data 802 may be identified within which a density of the pest population is greater than some threshold. Similarly, a volume of area 808 of the distribution data 804 may be identified within which a density of the pest population is greater than some threshold. In these embodiments, a rate of change in the pest population may be determined as a function of a change in volume between the area 806 and the area 808 with respect to a difference in time between time $T_1$ and time $T_2$.

In some embodiments, a risk of crop failure may be determined based upon the determined rate of change in the pest population. For example, each classification of pest may be associated with a destructiveness profile for each of various types of plants. This destructiveness profile may be used to identify a threshold population value for the pest that, when exceeded, is likely to result in crop failure. In some embodiments, a risk of crop failure may be determined based upon a probability that the pest population will reach that threshold population value. In some embodiments, such a determination may be made based on a current population of the pest and a rate of change in the pest population (e.g., as determined by a difference in distribution data). In some cases, the determination may be made by generating a predicted population growth model based on the distribution data.

In some embodiments, an effectiveness for a pest control solution may be determined based on the determined rate of change in the pest population. For example, upon implementation of a particular pest control solution, embodiments may attribute a decrease in the pest population (if any) to the implemented solution. In some cases, an expected rate of change is determined based upon an effectiveness currently associated with the solution. In these cases, the rate of change calculated in the pest population from the distribution data (e.g., distribution data 802 and 804) is compared to the expected rate of change. Upon determining that the determined rate of change varies from the expected rate of change, the effectiveness associated with the solution may be updated based on such a variance.

Figure 9:
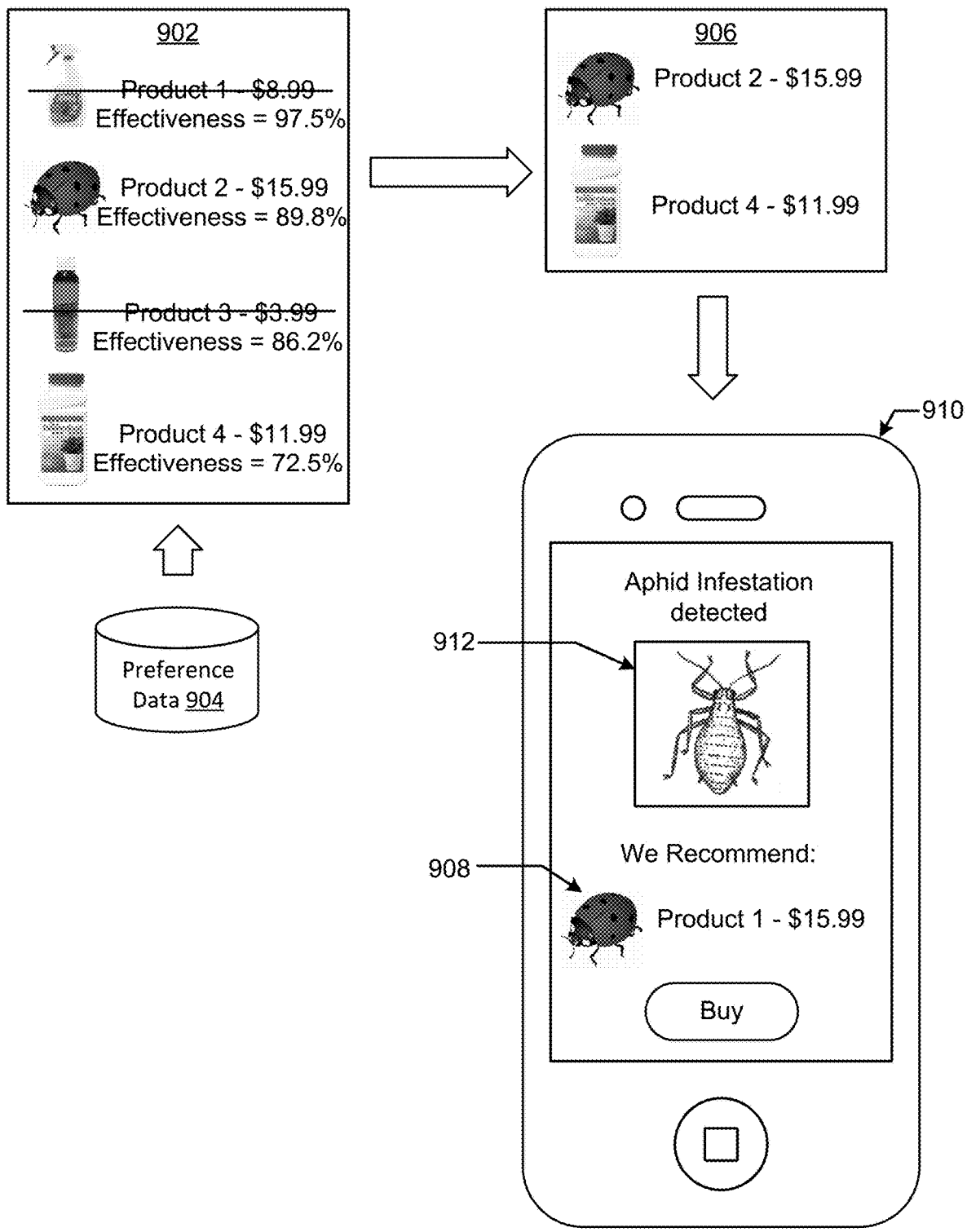
FIG. 9 depicts a process by which a product or service may be presented to a user of a horticultural management device in accordance with at least some embodiments.

FIG. 9 depicts a process by which a product or service may be presented to a user of a horticultural management device in accordance with at least some embodiments. In some embodiments, a service platform (e.g., service platform 116) may maintain information on an effectiveness rating for each of a number of different products (goods and/or services). Each of those effectiveness ratings may pertain to the product's effectiveness with respect to a particular pest classification. In some embodiments, the service platform may maintain effectiveness ratings for the product associated with not only pest classifications, but also plant types.

Upon detection of a potential pest infestation as described elsewhere, the service platform may generate a set of potential solutions 902 that includes a set of products (e.g., goods and/or services) that are available. For example, a set of products may include products currently available in a warehouse. In another example, the set of products may include products available for purchase from a third-party vendor such as an electronic retailer. In some embodiments, the products within the set of potential solutions 902 may be ordered based on an associated effectiveness rating.

In some embodiments, additional factors may be used in generating a set of potential solutions. For example, the service platform may predict (e.g., based on a predicted rate of change in the pest population) a time/date by which a pest infestation is determined to be likely to become critical, if left unchecked. In this example, the risk of crop failure may increase substantially if such a date/time arrives and the pest infestation has not yet been mitigated. Accordingly, a set of potential solutions may only include products that can be provided on or before such a date. In some cases, products in the set of potential solutions may be reordered based on a date by which the product can be received.

Any suitable additional factor may be taken into account when generating a set of potential solutions. In one example, a level of the determined risk may be taken into account when generating the set of potential solutions. For example, an expensive and fast-acting treatment may be needed to eradicate high-risk pest threat quickly, while a low-cost and slow-acting treatment can be used for a low-risk threat. In another example, the historical and expected environmental conditions (e.g., temperature, humidity, light levels, cloud cover, etc.) of a grow operation, along with the geographic location of the grow operation, may be used to adjust an effectiveness rating for each treatment for a pest classification. In some cases, there may be some heuristic known by the grower, or some other source of tribal knowledge, that could be leveraged in order to provide a more informed recommendation. Hence, some embodiments may take into account user feedback. Feedback may be a single number or multidimensional vector, where each dimension represents some attribute about a product. Such feedback can provide a valuable vector of data that correlates, to some degree, the effectiveness of the product.

In some embodiments, the set of potential solutions may include a recommendation to purchase more insect traps. For example, a particular type of insect trap may be determined by the system from the images collected from visual observer devices (e.g., using object recognition). In these embodiments, the system may determine that the insect trap in an image is sufficiently covered by insects that the insect trap should be replaced. In this example, the system may identify a product listing that corresponds to the identified insect trap within a set of products available for purchase from a third-party vendor such as an electronic retailer. In these embodiments, the system may provide instructions to one or more user devices that include locations of insect traps to be replaced with new insect traps.

Once a set of potential solutions 902 has been generated, the products included within the set of potential solutions may be filtered based on preference data 904 stored in association with the grow operation/user. In some cases, the preference data 904 may include an indication of products or types of products that cannot be used. For example, a grow operation may indicate that only certified organic products may be used. In this example, any products that are not certified organic may be filtered out of the set of potential solutions. In the depicted FIG. 9, Product 1 and Product 3 are shown to have been removed from the set of potential solutions based on preference data 904 in order to generate a set of solutions 906.

Once a set of solutions 906 has been generated, information related to at least one product from the set of solutions 906 is provided to an entity. For example, information 908 about at least one product from the set of solutions 906 may be presented to a user via a user device 910 (e.g., a horticultural management device). In some embodiments, information about the pest infestation 912 may also be provided to the user device 910 for presentation to the user.

In some embodiments, information provided to a user device 910 by a service platform may be presented via a mobile application installed upon, and executed from a memory of, the user device 910. Such a mobile application may, upon execution, cause a graphical user interface (GUI) to be presented to a user of the user device 910. In some embodiments, the mobile application may interact with the service platform via one or more application programming interfaces (APIs).

Figure 10:
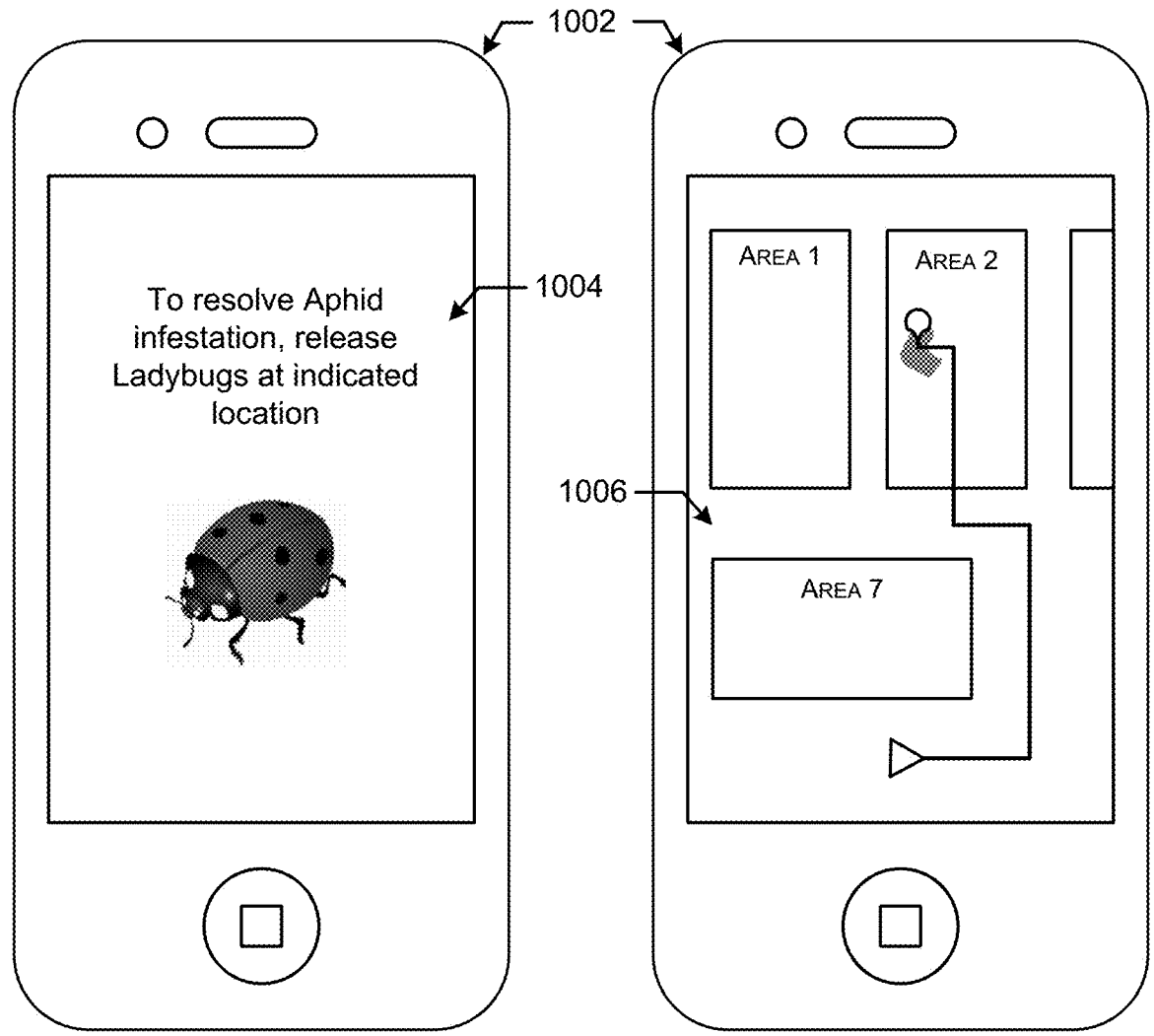
FIG. 10 depicts examples of information that may be presented via a graphical user interface implemented in accordance with at least some embodiments.

FIG. 10 depicts examples of information that may be presented via a graphical user interface implemented in accordance with at least some embodiments. As noted elsewhere, a service platform as described herein may provide information to a user device 1002 (e.g., a horticultural management device as described elsewhere). The information provided to the user device may be presented via a GUI associated with the service platform.

In some embodiments, the information provided to the user device and presented to a user via a GUI may include a recommendation 1004. In some embodiments, such a recommendation may be accompanied by instructions for addressing an identified pest infestation.

In some embodiments, the information provided to the user device and presented to a user via a GUI may include an indication of a location 1006 associated with a detected pest infestation as well as instructions on traversing to that location. In some embodiments, the mobile application may have access to a map of an area or region that includes the grow operation at which the pest infestation has been detected.

Figure 11:
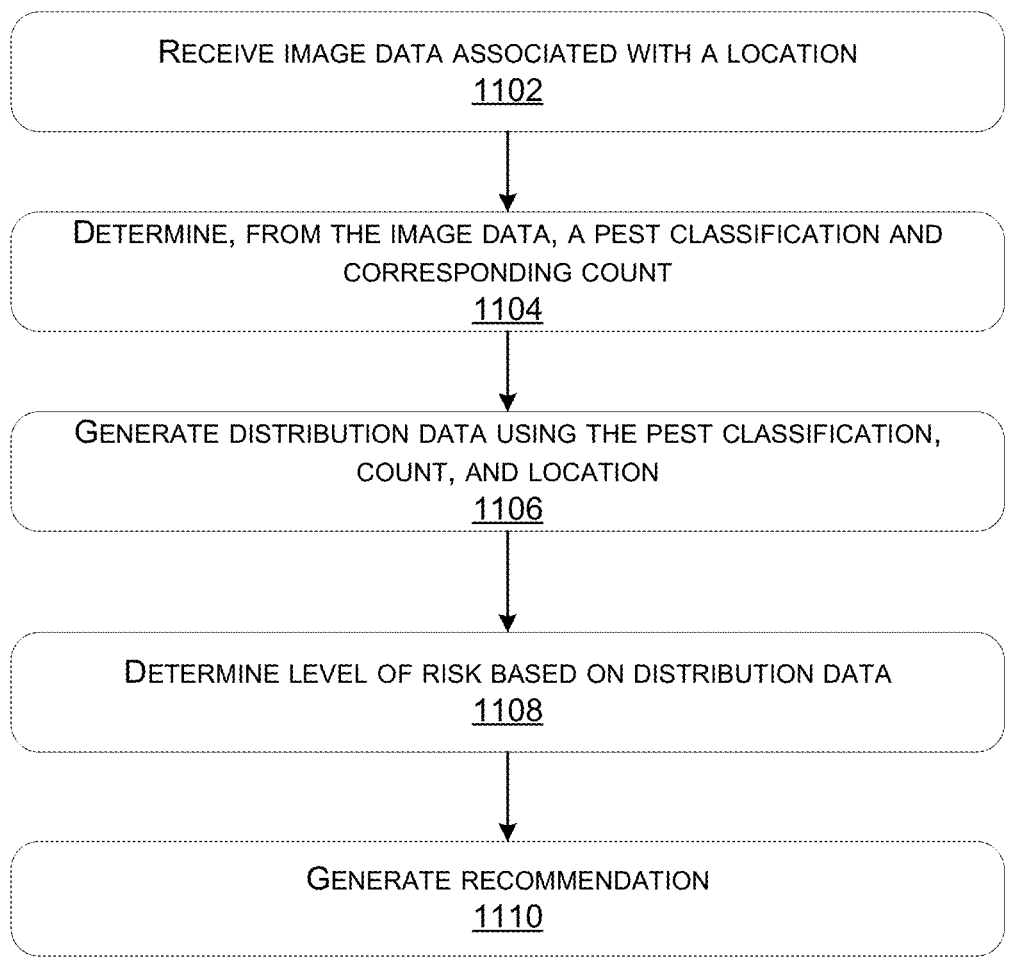
FIG. 11 depicts a flow diagram illustrating a process for determining a level of risk associated with a pest infestation and providing a recommendation for an action to resolve the pest infestation in accordance with at least some embodiments.

FIG. 11 depicts a flow diagram illustrating a process for determining a level of risk associated with a pest infestation and providing a recommendation for an action to resolve the pest infestation in accordance with at least some embodiments. In accordance with embodiments, the process 1100 may be performed by various components of the pest distribution determination system described with respect to FIG. 1, such as the visual observer device 110, a central computing device 112, a service platform 116 and/or a horticultural management device 126.

At 1102, the process 100 comprises receiving, from a visual observer device, image data, the image data being associated with a location within a grow operation. A visual observer device may comprise any suitable device having a camera. In some embodiments, the visual observer device comprises one of a static camera, a mobile camera (e.g., a camera mounted on rails), or an unmanned vehicle (e.g., a UAV). In some embodiments, the image data comprises an image of an insect trap. In some embodiments, the image data comprises an image of a portion of a plant. In some embodiments, the visual observer device traverses an area within a grow operation and captures images at various locations throughout the traversed area.

At 1104, the process 100 comprises determining, from the image data, at least one pest classification and a count associated with the pest classification. In some embodiments, this comprises using one or more object recognition techniques on the image data.

At 1106, the process 100 comprises generating a distribution data based on the at least one pest classification, count, and location. In some embodiments, the distribution data comprises information about a population of the at least one pest classification throughout an area. In some embodiments, the distribution data is generated by interpolating count data across an area based on the determined count. Additionally, the process may further comprise determining, based on the distribution data, a location of a pest infestation associated with the pest classification. To do this, the process may identify a variance between count data for a location in the distribution data and an expected count data for that location. In some embodiments, the distribution data is generated using known relationships between different locations within the grow operation. For example, the distribution data is generated using a graph neural network.

At 1108, the process 100 comprises determining a level of risk associated with the distribution data. In some embodiments, determining the level of risk associated with the distribution data comprises retrieving a destructiveness profile associated with the at least one pest classification. In some cases, the destructiveness profile associated with the at least one pest classification is specific to a type of plant located at the location within the grow operation.

At 1110, the process 100 comprises, upon determining that the level of risk is greater than a threshold level of risk, generating a recommendation based at least in part on the distribution data. In some embodiments, the threshold level of risk comprises a percentage probability that a crop failure will occur. In some embodiments, the recommendation comprises a recommendation for a good or service available to the grow operation. In some cases, generating the recommendation comprises generating a set of potential solutions and filtering the set of potential solutions based on preferences associated with the grow operation.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
receiving, from a camera device, image data, the image data being associated with a location within a grow operation;
determining, from the image data, at least one pest classification and a count associated with the at least one pest classification;
generating a distribution data based on the at least one pest classification, count, and location;
determining a level of risk associated with the distribution data;
based on the at least one pest classification, determining a threshold level of risk;
comparing the level of risk associated with the distribution data to the threshold level of risk that is based on the at least one pest classification;
based on comparing the level of risk associated with the distribution data to the threshold level of risk that is based on the at least one pest classification, determining that the level of risk associated with the distribution data is greater than a threshold level of risk that is based on the at least one pest classification;
identifying a pest infestation based at least in part on the distribution data;
based on determining that the level of risk associated with the distribution data is greater than a threshold level of risk that is based on the at least one pest classification,
generating a recommendation that includes a set of potential solutions that address the pest infestation;
based on the at least one pest classification, determining an effectiveness rating for each potential solution of the set of potential solutions that address the pest infestation;
determining preferences associated with the grow operation;
based on the preferences associated with the grow operation, determining a weight for each potential solution of the set of potential solutions;
ranking the set of potential solutions based on the weight of each potential solution;
comparing each effectiveness rating for each potential solution of the set of potential solutions to an effectiveness rating threshold;
based on the ranking of the potential solutions and based on comparing each effectiveness rating for each potential solution of the set of potential solutions to an effectiveness rating threshold, selecting a subset of the set of potential solutions;
providing, for output to a robotic device, the subset of the set of potential solutions and an instruction to implement the subset of the set of potential solutions, wherein the robotic device implements the subset of the set of potential solutions in response to receiving the instruction to implement the subset of the set of potential solutions;
determining that the robotic device has implemented the subset of the set of potential solutions;
receiving, from the camera device, additional image data, the additional image data being associated with the location within the grow operation;
determining, from the image data, an updated count associated with the at least one pest classification; and
based on the updated count associated with the at least one pest classification, updating each effectiveness rating for each potential solution of the subset of the set of potential solutions.

2. The computer-implemented method of claim 1, wherein determining the level of risk associated with the distribution data comprises retrieving a destructiveness profile associated with the at least one pest classification.

3. The computer-implemented method of claim 2, wherein the destructiveness profile associated with the at least one pest classification is specific to a type of plant located at the location within the grow operation.

4. The computer-implemented method of claim 1, wherein the image data comprises an image of an insect trap.

5. The computer-implemented method of claim 1, wherein the image data comprises an image of a portion of a plant or group of plants.

6. The computer-implemented method of claim 1, wherein the distribution data comprises information about a population of the at least one pest classification throughout an area.

7. The computer-implemented method of claim 1, wherein the distribution data comprises information about at least one of a pest size or a pest maturity.

8. The computer-implemented method of claim 1, wherein the threshold level of risk comprises a percentage probability that a crop failure will occur.

9. A computing device comprising:
a processor; and
a memory including instructions that, when executed with the processor, cause the computing device to, at least:

receive, from a visual observer device, image data, the image data being associated with a location within a grow operation;
determine, from the image data, at least one pest classification and a count associated with the at least one pest classification;
generate a distribution data based on the at least one pest classification, count, and location;
determine a level of risk associated with the distribution data;
based on the at least one pest classification, determine a threshold level of risk;
compare the level of risk associated with the distribution data to the threshold level of risk that is based on the at least one pest classification;
based on comparing the level of risk associated with the distribution data to the threshold level of risk that is based on the at least one pest classification, determine that the level of risk associated with the distribution data is greater than a threshold level of risk that is based on the at least one pest classification;
identify a pest infestation associated with the pest classification based on the generated distribution data;
based on determining that the level of risk associated with the distribution data is greater than a threshold level of risk that is based on the at least one pest classification, generating a recommendation that includes a set of potential solutions to address the pest infestation;
based on the at least one pest classification, determine an effectiveness rating for each potential solution of the set of potential solutions that address the pest infestation;
determining preferences associated with the grow operation;
based on the preferences associated with the grow operation, determining a weight for each potential solution of the set of potential solutions;
ranking the set of potential solutions based on the weight of each potential solution;
compare each effectiveness rating for each potential solution of the set of potential solutions to an effectiveness rating threshold;
based on the ranking of the potential solutions and based on comparing each effectiveness rating for each potential solution of the set of potential solutions to an effectiveness rating threshold, selecting a subset of the set of potential solutions:
provide, for output to a robotic device, the subset of the set of potential solutions and an instruction to implement the subset of the set of potential solutions, wherein the robotic device implements the subset of the set of potential solutions in response to receiving the instruction to implement the subset of the set of potential solutions;
determine that the robotic device has implemented the subset of the set of potential solutions;
receive, from the visual observer device, additional image data, the additional image data being associated with the location within the grow operation;
determine, from the image data, an updated count associated with the at least one pest classification; and
based on the updated count associated with the at least one pest classification, update each effectiveness rating for each potential solution of the subset of the set of potential solutions.

10. The computing device of claim 9, wherein the distribution data is generated by interpolating count data across an area based on the determined count.

11. The computing device of claim 9, wherein the instructions further cause the computing device to determine, based on the distribution data, a location of the pest infestation associated with the pest classification.

12. The computing device of claim 11, wherein determining a location of a pest infestation comprises identifying a variance between count data for the location in the distribution data and an expected count data for the location.

13. The computing device of claim 9, wherein the recommendation comprises a recommendation for a good or service available to the grow operation.

14. The computing device of claim 9, wherein the distribution data is generated using a machine learning model.

15. A non-transitory computer-readable media collectively storing computer-executable instructions that upon execution cause one or more computing devices to collectively perform acts comprising:
receiving, from a visual observer device, image data, the image data being associated with a location within a grow operation;
determining, from the image data, at least one pest classification and a count associated with the at least one pest classification;
generating a distribution data based on the at least one pest classification, count, and location;
determining a level of risk associated with the distribution data;
based on the at least one pest classification, determining a threshold level of risk;
comparing the level of risk associated with the distribution data to the threshold level of risk that is based on the at least one pest classification;
based on comparing the level of risk associated with the distribution data to the threshold level of risk that is based on the at least one pest classification, determining that the level of risk associated with the distribution data is greater than a threshold level of risk that is based on the at least one pest classification;
identifying a pest infestation associated with the pest classification based on the distribution data;
based on determining that the level of risk associated with the distribution data is greater than a threshold level of risk that is based on the at least one pest classification, generating a recommendation that includes a set of potential solutions that address the pest infestation;
based on the at least one pest classification, determining an effectiveness rating for each potential solution of the set of potential solutions that address the pest infestation;
determining preferences associated with the grow operation;
based on the preferences associated with the grow operation, determining a weight for each potential solution of the set of potential solutions;
ranking the set of potential solutions based on the weight of each potential solution;
comparing each effectiveness rating for each potential solution of the set of potential solutions to an effectiveness rating threshold;

based on the ranking of the potential solutions and based on comparing each effectiveness rating for each potential solution of the set of potential solutions to an effectiveness rating threshold, selecting a subset of the set of potential solutions;

providing, for output to a robotic device, the subset of the set of potential solutions and an instruction to implement the subset of the set of potential solutions, wherein the robotic device implements the subset of the set of potential solutions in response to receiving the instruction to implement the subset of the set of potential solutions;

determining that the robotic device has implemented the subset of the set of potential solutions;

receiving, from the visual observer device, additional image data, the additional image data being associated with the location within the grow operation;

determining, from the image data, an updated count associated with the at least one pest classification; and based on the updated count associated with the at least one pest classification, updating each effectiveness rating for each potential solution of the subset of the set of potential solutions.

16. The non-transitory computer-readable media of claim 15, wherein the distribution data is generated using one or more relationships between different locations within the grow operation.

17. The non-transitory computer-readable media of claim 15, wherein the recommendation is provided to a horticultural management device operated by a user associated with the grow operation.

18. The non-transitory computer-readable media of claim 17, wherein the recommendation comprises instructions to perform the subset of the set of potential solutions at a location associated with the pest infestation.

* * * * *